US009842130B2

(12) United States Patent
Schiffmann et al.

(10) Patent No.: US 9,842,130 B2
(45) Date of Patent: *Dec. 12, 2017

(54) ENUMERATION OF TREES FROM FINITE NUMBER OF NODES

(71) Applicant: Robert T. and Virginia T. Jenkins as Trustees of the Jenkins Family Trust Dated Feb. 8, 2002, Sacaramento, CA (US)

(72) Inventors: Karl Schiffmann, Santa Barbara, CA (US); Mark Andrews, Pleasant Hill, CA (US); Jack J. LeTourneau, Ventura, CA (US)

(73) Assignee: Robert T. and Virginia T. Jenkins as Trustees of the Jenkins Family Trust Dated Feb. 8, 2002, Sacramento, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/214,168

(22) Filed: Jul. 19, 2016

(65) Prior Publication Data
US 2016/0328431 A1 Nov. 10, 2016

Related U.S. Application Data

(63) Continuation of application No. 14/625,473, filed on Feb. 18, 2015, now Pat. No. 9,411,841, which is a continuation of application No. 14/086,808, filed on Nov. 21, 2013, now Pat. No. 9,002,862, which is a continuation of application No. 12/627,816, filed on Nov. 30, 2009, now Pat. No. 8,612,461, which is a continuation of application No. 11/006,440, filed on Dec. 6, 2004, now Pat. No. 7,636,727.

(60) Provisional application No. 60/632,203, filed on Nov. 30, 2004.

(51) Int. Cl.
*G06F 17/30* (2006.01)
*G06F 7/00* (2006.01)

(52) U.S. Cl.
CPC .. *G06F 17/30327* (2013.01); *G06F 17/30292* (2013.01); *G06F 17/30333* (2013.01); *G06F 17/30961* (2013.01); *Y10S 707/99942* (2013.01)

(58) Field of Classification Search
CPC ......... G06F 17/30961; G06F 17/30333; Y10S 707/99942
USPC ................................ 707/102, 101, 755, 802
See application file for complete search history.

(56) References Cited

U.S. PATENT DOCUMENTS

| | | |
|---|---|---|
| 3,201,701 A | 8/1965 | Maitra |
| 3,704,345 A | 11/1972 | Coker |
| 4,001,951 A | 1/1977 | Fasse |
| 4,134,218 A | 1/1979 | Adams et al. |
| 4,156,910 A | 5/1979 | Barton et al. |
| 4,439,162 A | 3/1984 | Blaine |
| 4,677,550 A | 6/1987 | Ferguson |

(Continued)

OTHER PUBLICATIONS

"Core Technology Benchmarks a White Paper", Jul. 2002, downloaded from the internet Mar. 2, 2004.

(Continued)

*Primary Examiner* — Kuen Lu
(74) *Attorney, Agent, or Firm* — Berkeley Law & Technology Group, LLP

(57) ABSTRACT

Embodiments of methods, apparatuses, devices and/or systems for manipulating hierarchical sets of data are disclosed.

36 Claims, 13 Drawing Sheets

(56) References Cited

U.S. PATENT DOCUMENTS

| | | |
|---|---|---|
| 4,737,109 A | 4/1988 | Abramson |
| 4,745,561 A | 5/1988 | Hirosawa et al. |
| 4,751,684 A | 6/1988 | Holt |
| 4,831,525 A | 5/1989 | Saito et al. |
| 4,867,686 A | 9/1989 | Goldstein |
| 4,905,138 A | 2/1990 | Bourne |
| 4,931,928 A | 6/1990 | Greenfeld |
| 4,949,388 A | 8/1990 | Bhaskaran |
| 4,989,132 A | 1/1991 | Mellender et al. |
| 4,991,087 A | 2/1991 | Burkowski et al. |
| 5,021,943 A | 6/1991 | Grimes |
| 5,021,992 A | 6/1991 | Kondo |
| 5,050,071 A | 9/1991 | Harris et al. |
| 5,191,522 A | 3/1993 | Bosco et al. |
| 5,235,701 A | 8/1993 | Ohler et al. |
| 5,265,245 A | 11/1993 | Nordstrom et al. |
| 5,295,261 A * | 3/1994 | Simonetti .......... G06F 17/30327 |
| 5,335,320 A | 8/1994 | Iwata |
| 5,335,345 A | 8/1994 | Frieder et al. |
| 5,355,496 A | 10/1994 | Fant et al. |
| 5,463,777 A | 10/1995 | Bialkowski et al. |
| 5,493,504 A | 2/1996 | Minato |
| 5,497,500 A | 3/1996 | Rogers et al. |
| 5,509,088 A * | 4/1996 | Robson ................ H03M 7/425 |
| | | 341/67 |
| 5,519,627 A | 5/1996 | Mahmood et al. |
| 5,522,068 A | 5/1996 | Berkowitz |
| 5,577,253 A | 11/1996 | Blickstein |
| 5,598,350 A | 1/1997 | Kawanishi et al. |
| 5,606,669 A | 2/1997 | Bertin et al. |
| 5,636,155 A | 6/1997 | Kabuo |
| 5,687,362 A | 11/1997 | Bhargava et al. |
| 5,706,406 A | 1/1998 | Pollock |
| 5,724,512 A | 3/1998 | Winterbottom |
| 5,724,576 A | 3/1998 | Letourneau |
| 5,748,975 A | 5/1998 | Van De Vanter |
| 5,758,152 A * | 5/1998 | LeTourneau ...... G06F 17/30569 |
| | | 707/741 |
| 5,778,371 A | 7/1998 | Fujihara |
| 5,781,906 A | 7/1998 | Aggarwal et al. |
| 5,787,415 A | 7/1998 | Jacobson et al. |
| 5,787,432 A | 7/1998 | Letourneau |
| 5,796,356 A | 8/1998 | Okada et al. |
| 5,802,370 A | 9/1998 | Sitbon et al. |
| 5,822,593 A | 10/1998 | Lamping et al. |
| 5,848,159 A | 12/1998 | Collins et al. |
| 5,930,805 A | 7/1999 | Marquis |
| 5,970,490 A | 10/1999 | Morgenstern |
| 5,978,790 A | 11/1999 | Buneman et al. |
| 5,999,926 A | 12/1999 | Suciu |
| 6,002,879 A | 12/1999 | Radigan et al. |
| 6,003,033 A | 12/1999 | Amano et al. |
| 6,022,879 A | 2/2000 | Crow et al. |
| 6,028,987 A | 2/2000 | Hirairi |
| 6,055,537 A | 4/2000 | LeTourneau |
| 6,076,087 A | 6/2000 | Suciu |
| 6,088,691 A | 7/2000 | Bhargava et al. |
| 6,141,655 A | 10/2000 | Johnson et al. |
| 6,199,103 B1 | 3/2001 | Sakaguchi et al. |
| 6,236,410 B1 | 5/2001 | Politis et al. |
| 6,243,859 B1 | 6/2001 | Chen-Kuang |
| 6,289,354 B1 | 9/2001 | Aggarwal et al. |
| 6,292,938 B1 | 9/2001 | Sarkar et al. |
| 6,314,559 B1 | 11/2001 | Sollich |
| 6,336,812 B1 | 1/2002 | Cooper et al. |
| 6,341,372 B1 | 1/2002 | Datig |
| 6,442,584 B1 | 8/2002 | Kolli et al. |
| 6,446,256 B1 | 9/2002 | Hyman et al. |
| 6,466,240 B1 | 10/2002 | Maslov |
| 6,505,205 B1 | 1/2003 | Kothuri et al. |
| 6,542,899 B1 | 4/2003 | Saulpaugh et al. |
| 6,550,024 B1 | 4/2003 | Pagurek et al. |
| 6,556,983 B1 | 4/2003 | Altschuler et al. |
| 6,598,052 B1 | 7/2003 | Saulpaugh et al. |
| 6,606,632 B1 | 8/2003 | Saulpaugh et al. |
| 6,606,741 B2 | 8/2003 | Kojima et al. |
| 6,609,130 B1 | 8/2003 | Saulpaugh et al. |
| 6,611,844 B1 | 8/2003 | Saulpaugh et al. |
| 6,658,649 B1 | 12/2003 | Bates et al. |
| 6,714,939 B2 * | 3/2004 | Saldanha .......... G06F 17/2229 |
| 6,745,384 B1 | 6/2004 | Biggerstaff |
| 6,748,378 B1 | 6/2004 | Lavender et al. |
| 6,763,515 B1 | 7/2004 | Vazquez et al. |
| 6,785,673 B1 | 8/2004 | Fernandez et al. |
| 6,817,865 B2 | 11/2004 | Charbonneau |
| 6,829,695 B1 | 12/2004 | Ross |
| 6,847,979 B2 | 1/2005 | Allemang et al. |
| 6,854,976 B1 | 2/2005 | Suhr |
| 6,874,005 B2 | 3/2005 | Fortenberry et al. |
| 6,965,990 B2 | 11/2005 | Barsness et al. |
| 6,968,330 B2 | 11/2005 | Edwards et al. |
| 6,978,271 B1 * | 12/2005 | Hoffman .......... G06F 17/30091 |
| 7,043,555 B1 | 5/2006 | McCain et al. |
| 7,051,033 B2 | 5/2006 | Agarwal et al. |
| 7,072,904 B2 * | 7/2006 | Najork .............. G06F 17/30961 |
| 7,103,838 B1 | 9/2006 | Krishnamurthy et al. |
| 7,107,265 B1 | 9/2006 | Calvignac et al. |
| 7,117,196 B2 | 10/2006 | Gaur et al. |
| 7,117,479 B2 | 10/2006 | Van De Vanter |
| 7,127,704 B2 | 10/2006 | Van De Vanter et al. |
| 7,134,075 B2 | 11/2006 | Hind et al. |
| 7,140,006 B2 | 11/2006 | Harrison et al. |
| 7,162,485 B2 | 1/2007 | Gottlob et al. |
| 7,191,182 B2 | 3/2007 | Anonsen et al. |
| 7,203,680 B2 | 4/2007 | Parida |
| 7,203,774 B1 * | 4/2007 | Zhou ..................... G06F 9/4411 |
| | | 710/17 |
| 7,287,026 B2 | 10/2007 | Oommen |
| 7,313,563 B2 | 12/2007 | Bordawekar et al. |
| 7,318,215 B1 | 1/2008 | Krishnan et al. |
| 7,356,802 B2 | 4/2008 | de Sutter et al. |
| 7,360,202 B1 | 4/2008 | Seshadri et al. |
| 7,409,673 B2 | 8/2008 | Kuo et al. |
| 7,419,376 B2 | 9/2008 | Sarvazyan et al. |
| 7,437,666 B2 | 10/2008 | Ramarao |
| 7,475,070 B2 | 1/2009 | Fan et al. |
| 7,496,892 B2 | 2/2009 | Nuss |
| 7,512,932 B2 | 3/2009 | Davidov et al. |
| 7,536,675 B2 | 5/2009 | Gallagher |
| 7,536,676 B2 | 5/2009 | Baker |
| 7,544,062 B1 | 6/2009 | Hauschild et al. |
| 7,561,927 B2 | 7/2009 | Oyama et al. |
| 7,571,156 B1 | 8/2009 | Gupta et al. |
| 7,571,169 B2 | 8/2009 | Jones et al. |
| 7,574,692 B2 | 8/2009 | Herscu |
| 7,575,434 B2 | 8/2009 | Palakodeti |
| 7,620,632 B2 | 11/2009 | Andrews |
| 7,627,591 B2 | 12/2009 | LeTourneau |
| 7,630,995 B2 | 12/2009 | LeTourneau |
| 7,636,727 B2 | 12/2009 | Schiffmann et al. |
| 7,650,592 B2 | 1/2010 | Eckels et al. |
| 7,669,183 B2 | 2/2010 | Bowman et al. |
| 7,681,177 B2 | 3/2010 | LeTourneau |
| 7,761,847 B2 | 7/2010 | Kornerup et al. |
| 7,761,858 B2 | 7/2010 | Chang et al. |
| 7,765,183 B2 | 7/2010 | Williams, Jr. |
| 7,779,396 B2 | 8/2010 | Meijer et al. |
| 7,801,923 B2 | 9/2010 | LeTourneau |
| 7,882,147 B2 | 2/2011 | LeTourneau |
| 7,890,928 B2 | 2/2011 | Patrudu |
| 7,899,821 B1 | 3/2011 | Schiffmann |
| 8,032,860 B2 | 10/2011 | Piehler et al. |
| 8,037,102 B2 | 10/2011 | LeTourneau |
| 8,060,868 B2 | 11/2011 | Meijer et al. |
| 8,112,740 B2 | 2/2012 | Meijer et al. |
| 8,151,276 B2 | 4/2012 | Grechanik |
| 8,181,155 B2 | 5/2012 | Pinto et al. |
| 8,230,526 B2 | 7/2012 | Holland et al. |
| 8,250,526 B2 | 8/2012 | Anderson et al. |
| 8,316,059 B1 | 11/2012 | Schiffmann |
| 8,356,040 B2 | 1/2013 | LeTourneau |
| 8,365,137 B2 | 1/2013 | Fant |
| 8,438,534 B2 | 5/2013 | Thomson |
| 8,443,339 B2 | 5/2013 | LeTourneau |

(56) References Cited

U.S. PATENT DOCUMENTS

| | | | |
|---|---|---|---|
| 8,626,777 B2 | 1/2014 | LeTourneau | |
| 8,650,201 B2 | 2/2014 | LeTourneau | |
| 8,683,431 B2 | 3/2014 | Thomson et al. | |
| 8,762,942 B2 | 6/2014 | Langworthy et al. | |
| 9,002,862 B2 | 4/2015 | Schiffmann | |
| 9,020,961 B2 | 4/2015 | LeTourneau | |
| 9,043,347 B2 | 5/2015 | LeTourneau | |
| 9,077,515 B2 | 7/2015 | LeTourneau | |
| 9,330,128 B2 | 5/2016 | Schiffmann | |
| 9,411,841 B2 | 8/2016 | Schiffmann | |
| 9,425,951 B2 | 8/2016 | LeTourneau | |
| 2001/0003211 A1 | 6/2001 | Bera | |
| 2002/0040292 A1 | 4/2002 | Marcu | |
| 2002/0059281 A1 | 5/2002 | Watanabe et al. | |
| 2002/0062259 A1 | 5/2002 | Katz et al. | |
| 2002/0091676 A1 | 7/2002 | Agrawal | |
| 2002/0107860 A1 | 8/2002 | Gobeille et al. | |
| 2002/0129129 A1 | 9/2002 | Bloch et al. | |
| 2002/0130796 A1 | 9/2002 | Tsuchido et al. | |
| 2002/0133497 A1 | 9/2002 | Draper et al. | |
| 2002/0149604 A1 | 10/2002 | Wilkinson | |
| 2002/0169563 A1 | 11/2002 | de Carvalho Ferreira | |
| 2002/0194163 A1 | 12/2002 | Hopeman | |
| 2003/0041088 A1* | 2/2003 | Wilson | G06F 15/177 718/104 |
| 2003/0065659 A1 | 4/2003 | Agarwal et al. | |
| 2003/0115559 A1 | 6/2003 | Sawada | |
| 2003/0130977 A1 | 7/2003 | Oommen | |
| 2003/0167445 A1 | 9/2003 | Su et al. | |
| 2003/0195885 A1 | 10/2003 | Emmick et al. | |
| 2003/0195890 A1 | 10/2003 | Oommen | |
| 2003/0236794 A1 | 12/2003 | Hostetter et al. | |
| 2004/0010752 A1 | 1/2004 | Chan et al. | |
| 2004/0024790 A1 | 2/2004 | Everett | |
| 2004/0044659 A1 | 3/2004 | Judd et al. | |
| 2004/0054692 A1 | 3/2004 | Seyrat et al. | |
| 2004/0060007 A1 | 3/2004 | Gottlob et al. | |
| 2004/0068498 A1 | 4/2004 | Patchet et al. | |
| 2004/0103105 A1 | 5/2004 | Lindblad et al. | |
| 2004/0122844 A1* | 6/2004 | Malloy | G06F 17/30592 |
| 2004/0205047 A1 | 10/2004 | Carpenter | |
| 2004/0215642 A1 | 10/2004 | Cameron et al. | |
| 2004/0239674 A1 | 12/2004 | Ewald et al. | |
| 2004/0254909 A1 | 12/2004 | Testa | |
| 2004/0260683 A1 | 12/2004 | Chan et al. | |
| 2004/0260684 A1 | 12/2004 | Agrawal et al. | |
| 2004/0268236 A1 | 12/2004 | Chidlovskii et al. | |
| 2005/0021548 A1 | 1/2005 | Bohannon et al. | |
| 2005/0023524 A1 | 2/2005 | Beatty | |
| 2005/0027743 A1* | 2/2005 | O'Neil | G06F 17/30917 |
| 2005/0050016 A1 | 3/2005 | Stanoi et al. | |
| 2005/0050066 A1 | 3/2005 | Hughes | |
| 2005/0058976 A1 | 3/2005 | Vernon | |
| 2005/0060332 A1 | 3/2005 | Bernstein et al. | |
| 2005/0065964 A1 | 3/2005 | Ziemann et al. | |
| 2005/0125432 A1 | 6/2005 | Lin et al. | |
| 2005/0138073 A1 | 6/2005 | Zhou et al. | |
| 2005/0154265 A1 | 7/2005 | Miro et al. | |
| 2005/0154979 A1 | 7/2005 | Chidlovskii et al. | |
| 2005/0156761 A1 | 7/2005 | Oh | |
| 2005/0165732 A1 | 7/2005 | Burges | |
| 2005/0187900 A1 | 8/2005 | LeTourneau | |
| 2005/0214727 A1 | 9/2005 | Stoianovici et al. | |
| 2005/0216445 A1 | 9/2005 | Rao | |
| 2005/0267908 A1 | 12/2005 | LeTourneau | |
| 2006/0004817 A1 | 1/2006 | Andrews | |
| 2006/0005122 A1 | 1/2006 | Lemoine | |
| 2006/0015538 A1 | 1/2006 | LeTourneau | |
| 2006/0053122 A1 | 3/2006 | Korn et al. | |
| 2006/0074838 A1 | 4/2006 | Srivastava | |
| 2006/0095442 A1 | 5/2006 | LeTourneau | |
| 2006/0095455 A1 | 5/2006 | LeTourneau | |
| 2006/0123029 A1 | 6/2006 | LeTourneau | |
| 2006/0129582 A1 | 6/2006 | Schiffmann et al. | |
| 2006/0209351 A1 | 9/2006 | Saito et al. | |
| 2006/0259533 A1 | 11/2006 | LeTourneau | |
| 2006/0271573 A1 | 11/2006 | LeTourneau | |
| 2007/0003917 A1 | 1/2007 | Kitching et al. | |
| 2007/0198538 A1 | 8/2007 | Palacios | |
| 2010/0094885 A1 | 4/2010 | Andrews | |
| 2010/0094908 A1 | 4/2010 | LeTourneau | |
| 2010/0114969 A1 | 5/2010 | LeTourneau | |
| 2010/0191775 A1 | 7/2010 | Schiffmann et al. | |
| 2010/0205581 A1 | 8/2010 | LeTourneau | |
| 2012/0144388 A1 | 6/2012 | Kurian et al. | |

OTHER PUBLICATIONS

"Origin Data, Inc. White Paper", © 1999, pp. 1-13.

"The Associative Model of Data White Paper", Lazy Software, Ltd., 2000.

ACM Portal Search Results (Kleene and prime and enumeration and operation and natural and numerals and sequences and "enumeration operation") conducted by Examiner on Jul. 18, 2009, 6 pages.

ACM Portal Search Results (Kleene and prime and enumeration and operation and natural and numerals and sequences and enumeration and operation) conducted by Examiner on Jul. 18, 2009, 1 page.

Alderson et al., "Toward an Optimization Driven Framework for Designing and Generating Realistic Internet Topologies" ACM SIGCOMM Computer Communications Review 41, vol. 33, No. 1, pp. 41-46, 2003.

Apostol, "A Centennial History of the Prime Number Theorem", Engineering and Science, No. 4, 1996.

Benedikt et al., "Definable Relations and First-Order Query Languages over Strings" Journal of the ACM, vol. 50, No. 5, pp. 694-751, 2003.

Cano et al., "Lazy Evaluation in Penniless Propagation over Join Trees", Networks, vol. 39(4), 2002 Wiley Periodicals, Inc., 175-185, 2002.

Cole, Richard, Hariharan, Ramesh, and Indyk, Piotr. "Tree pattern matching and subset matching in deterministic O(n log 3 n)-time", Proceedings of the Tenth Annual ACM-SIAM Symposium on Discrete Algorithms, p. 1-10, Jan. 2, 1999, Baltimore, Maryland, United States.

Cooper et al., "Oh! Pascal!", 1982, W.W. Norton & Company, Inc., Chapter 12, Arrays for Random Access, pp. 295-327.

Coenen, Frans; Leng, Paul and Ahmed, Shakil; "T-Trees, Vertical Partitioning and Distributed Association Rule Mining", IEEE, 2003.

Dubiner, M., Galil, Z., and Magen, E. "Faster Tree Pattern Matching.", Journal of the Association for Computing Machinery, vol. 41, No. 2, Mar. 1994, pp. 205-213.

Durango Bill's Enumeration of Trees. http://web.archive.org/web/20021028184112/http://www.durangobill.com/Trees.html, 1998.

Er, M.C., "Enumerating Ordered Trees Lexicographically", The Computation Journal, vol. 28, Issue 5, pp. 538-542, 1985.

Google search (Kleene prime enumeration operation natural numerals sequences "Kleene prime") conducted by Examiner on Jul. 18, 2009, 2 pages.

Ferragina et al., "The String B-Tree: A New Data Structure for String Search in External Memory and Its Applications", Journal of the ACM, vol. 46, No. 2, pp. 236-280, 1999.

Google Search (Kleene prime enumeration operation natural numerals sequences "enumeration operation") conducted by Examiner on Jul. 18, 2009, 2 pages.

Google Search (Kleene prime enumeration operation) conducted by Examiner on Jul. 18, 2009, 2 pages.

Hoffman et al., "Pattern Matching in Trees", Purdue University, Jan. 1982, Journal for the Association for Computing Machinery, vol. 29, Issue 1, pp. 68-95.

Iacob et al., "XPath Extension for Querying Concurrent XML Markup", Technical Report #TR 394-04, Department of Computer Science, University of Kentucky, Lexington, KY 40506, Mar. 6, 2004, 15 pages.

IEEE Explore Digital Library Search Result conducted by Examiner on Jul. 18, 2009, 1 page.

Johnston et al. Advances in Dataflow Programming Languages, ACM Computing Surveys, vol. 36, No. 1, pp. 1-34, 2004.

(56) References Cited

OTHER PUBLICATIONS

Kharbutli et al., "Using Prime Numbers for Cache Indexing to Eliminate Conflict Misses", Dept. of Electrical and Computer Engineering, North Carolina State University, Feb. 2004, 24 pages.
Kilpelainen, "Tree Matching Problems with Applications to Structured Text Databases", Ph.D. Dissertation, Department of Computer Science, University of Helsinki, Report A-1992-6, Helsinki, Finland, pp. 1-109, Nov. 1992.
Knuth, "The Art of Computer Programming", vol. 1 Fundamental Algorithms, Second edition, Addison-Wesley Series in *Computer Science and Information Processing*, ISBN 0-201-03809-9, Reading, Massachusetts, Copyright 1973.
Leinonen et al., "Automation of Document Structure Transformations", Auditorium, Microteknia Building, University of Kuopio, Nov. 5, 2004, 68 pages.
Lerman et al., "Learning the Common Structure of Data", American Association for Artificial Intelligence, AAAI-00 Proceedings, www.aaai.org, Apr. 13, 2000, 6 pages.
Letourneau, "The Elementary Theory of Object Oriented Arithmetic", pp. 1-9, Apr. 1990.
Malhotra et al, "A Methodology for Formal Expression of Hierarchy in Model Solution", IEEE, pp. 258-267,1983.
Navarro, "A Guided Tour to Approximate String Matching", ACM Computing Surveys, vol. 33, No. 1, pp. 31-88, 2001.
Neven, Frank and Thomas Schwentick, "Expressive and efficient pattern languages for tree-structured data" Proceedings of the Nineteenth ACM SIGACT-SIGMOD-SIGART Symposium on Principles of Database Systems, May 2000.
Prasad et al., "Efficient Bit-Parallel Multi-Patterns String Matching Algorithms for Limited Expression", ACM, pp. 1-6, 2010.
Ramesh, R. and Ramakrishnan, I.V., "Nonlinear Pattern Matching in Trees." Journal of the Association for Computer Machinery, vol. 39, No. 2. Apr. 1992, pp. 295-316.
Reiss, "Semantics-Based Code Search", IEEE ICSE, pp. 243-253, 2009.
Schmidt et al., "Comparision of Tree and Graph Encodings as Function of Problem Complexity", ACM, pp. 1674-1679, 2007.
Sechrest et al., "Blending Hierarchical and Attribute-Based File Naming", Distributed Computing System, 1992, Proceedings of the 12th International Conference on Jun. 9-12, 1992, pp. 572-580.
Shanmugasundaram et al., "Querying SML Views of Relational Data", Proceedings of the 27th VLDB Conference, Roma, Italy, 2001, 9 pages.
Sinha et al, "Efficient Trie Based Sorting of Large Sets of Strings," ACM, pp. 1-8, 2003.
Sitaraman, Krishna, Ranganathan, N., and Ejnioui, Abdel, "A VLSI Architecture for Object Recognition using Tree Matching" Proceedings of the IEEE International Conference on Application-Specific Systems, Architectures, and Processors (ASAP'02) Dec. 2001, pp. 1-71.
Smorynski, Craig, "Logical Number Theory I: An Introduction", Springer-Verlag Berlin Heidelberg, © 1991, Arithmetic Encoding, The Cantor Pairing Function, pp. 14-23, and 305.
Somani et al., "Phased-Mission System Analysis Using Boolean Algebraic Methods", May 1994, ACM Press, vol. 22, Issue 1.
Spinells "Declarative Peephole Optimization Using String Pattern Matching", ACM, pp. 47-51, 1999.
Sproat et al., "Compilation of Weighted Finite-State Tranducers from Decision Trees" ACM, pp. 215-222, 1996.
Stanat, D.F., and McAllister, D.F., "Discrete Mathematics in Computer Science", Prentice-Hall, 1977, Binary Relations, Ch. 3, Sec. 3.2, Trees, p. 131-145.
Talukdar, "Learning to Create Data-Integrating Queries", ACM PVLDB , pp. 785-796, 2008.
Thiemann, "Grammar-Based Analysis of String Expressions", ACM, pp. 59-70, 2005.
Valiente, "Algorithms on Trees and Graphs", Tree Isomorphism, pp. 151-251, Springer 2002.
Valiente, Gabriel, "Tree Isomorphism," of Algorithms on Trees and Graphs, Chapter 4, published by Springer, 2002, 51 pages.
Wagner et al., "The String-to-String Correction Problem", Journal of the Association for Computing Machinery, vol. 21, No. 1, pp. 168-173, 1974.
Wu, "A Prime Number Labeling Scheme for Dynamic Ordered XML Trees", IEEE, 2004, 13 pages.
Xie et al., "S-Looper: Automatice Summarization for Multipath String Loops", ACM, pp. 188-198, 2015.
Yates et al, "A New Approach to Text Searchin", Communications of the ACM, vol. 35, No. 10, pp. 74-82, 1992.
Zaks, S., "Lexicographic Generation of Ordered Trees", Dept. of Computer Science, University of Illinois, The Journal of Theoretical Computer Science, vol. 10(1), pp. 63-82, Revised 1978.
U.S. Appl. No. 11/005,859: Application filed Dec. 6, 2004, 120 pages.
U.S. Appl. No. 11/005,859: Notice to File Missing parts dated Jan. 10, 2005, 2 pages.
U.S. Appl. No. 11/005,859: Response to Notice to File Missing parts dated Apr. 1, 2005, 9 pages.
U.S. Appl. No. 11/005,859: Preliminary Amendment filed Apr. 28, 2005, 193 pages.
U.S. Appl. No. 11/005,859: Office Action—Restriction Requirement dated Dec. 12, 2007, 7 pages.
U.S. Appl. No. 11/005,859: Response to Office Action—Restriction Requirement filed Jan. 14, 2008, 82 pages.
U.S. Appl. No. 11/005,859: Non-final Office Action dated Mar. 21, 2008, 10 pages.
U.S. Appl. No. 11/005,859: Amendment filed Jul. 21, 2008, 86 pages.
U.S. Appl. No. 11/005,859: Final Office Action dated Oct. 30, 2008, 14 pages.
U.S. Appl. No. 11/005,859: Amendment filed Dec. 30, 2008, 83 pages.
U.S. Appl. No. 11/005,859: Advisory Action dated Jan. 13, 2009, 4 pages.
U.S. Appl. No. 11/005,859: RCE with amendment filed Apr. 30, 2009, 86 pages.
U.S. Appl. No. 11/005,859: Final Office Action dated Jul. 8, 2009, 8 pages.
U.S. Appl. No. 11/005,859: Examiner Interview Summary received Oct. 27, 2009, 3 pages.
U.S. Appl. No. 11/005,859: Amendment filed Dec. 8, 2009, 83 pages.
U.S. Appl. No. 11/005,859: Advisory Action dated Dec. 22, 2009, 3 pages.
U.S. Appl. No. 11/005,859: RCE with Amendment filed Jan. 7, 2010, 85 pages.
U.S. Appl. No. 11/005,859: Non-Final Office Action dated Jan. 21, 2010, 8 pages.
U.S. Appl. No. 11/005,859: Response to Non-Final Office Action filed Feb. 25, 2010, 83 pages.
U.S. Appl. No. 11/005,859: Final Office Action dated Jun. 8, 2010, 9 pages.
U.S. Appl. No. 11/005,859: Office Action Response dated Sep. 1, 2010, 89 pages.
U.S. Appl. No. 11/005,859: Advisory Action dated Sep. 14, 2010, 3 pages.
U.S. Appl. No. 11/005,859: Notice of Appeal dated Sep. 29, 2010, 1 page.
U.S. Appl. No. 11/005,859: Office Action dated Oct. 15, 2010, 5 pages.
U.S. Appl. No. 11/005,859: Office Action Response dated Jan. 18, 2011, 95 pages.
U.S. Appl. No. 11/005,859: Final Office Action dated Mar. 30, 2011, 7 pages.
U.S. Appl. No. 11/005,859: Notice of Allowance and Fees Due, dated Jun. 9, 2011, 11 pages.
U.S. Appl. No. 11/005,859: Amendment after Notice of Allowance and Issue Fee Payment, dated Sep. 9, 2011, 2 pages.
U.S. Appl. No. 11/005,859: Issue Notification, dated Sep. 21, 2011, 1 page.
U.S. Appl. No. 13/229,624, filed Sep. 9, 2011, 139 pages.
U.S. Appl. No. 13/229,624: Filing receipt, dated Sep. 21, 2011, 4 pages.

(56) References Cited

OTHER PUBLICATIONS

U.S. Appl. No. 13/229,624: Non-Final Office Action, dated Nov. 23, 2011, 8 pages.
U.S. Appl. No. 13/229,624: Notice of Publication, dated Dec. 30, 2011, 1 page.
U.S. Appl. No. 13/229,624: Amendment, dated Feb. 23, 2012, 22 pages.
U.S. Appl. No. 13/229,624: Final Office Action, dated Mar. 20, 2012, 10 pages.
U.S. Appl. No. 13/229,624: Amendment after final, dated Jun. 13, 2012, 25 pages.
U.S. Appl. No. 13/229,624: Advisory Action, dated Jun. 20, 2012, 4 pages.
U.S. Appl. No. 13/229,624: RCE, dated Jul. 20, 2012, 26 pages.
U.S. Appl. No. 13/229,624: Non-Final Rejection, dated Oct. 2, 2013, 9 pages.
U.S. Appl. No. 13/229,624: Response to non-final office action, dated Dec. 27, 2013, 11 pages.
U.S. Appl. No. 13/229,624: Non-Final Office Action, dated Apr. 4, 2014, 5 Pages.
U.S. Appl. No. 13/229,624: Non-Final Office Action Response, dated Aug. 1, 2014, 9 Pages.
U.S. Appl. No. 13/229,624: Final Rejection dated Oct. 30, 2014, 6 pages.
U.S. Appl. No. 13/229,624: Response and Amendments after Final, filed Jan. 30, 2015, 11 pages.
U.S. Appl. No. 13/229,624: Advisory Action, dated Mar. 11, 2015, 3 pages.
U.S. Appl. No. 13/229,624: Applicant Initiated Interview Summary, dated Mar. 19, 2015, 3 pages.
U.S. Appl. No. 13/229,624: Response After Final Action and Interview Summary, filed Mar. 27, 2015, 20 pages.
U.S. Appl. No. 13/229,624: RCE and Amendments, filed Apr. 27, 2015, 17 pages.
U.S. Appl. No. 13/229,624: Notice of Allowance and Fees, dated Jul. 6, 2015, 21 pages.
U.S. Appl. No. 13/229,624: Issue Fee Payment, dated Sep. 28, 2015, 1 page.
U.S. Appl. No. 13/229,624: Issue Notification, dated Oct. 14, 2015, 1 page.
U.S. Appl. No. 14/870,744: Application as filed Sep. 30, 2015, 127 pages.
U.S. Appl. No. 14/870,744: Preliminary Amendments, dated Oct. 6, 2015, 10 pages.
U.S. Appl. No. 14/870,744: Notice to File Missing Parts, dated Oct. 16, 2015, 2 pages.
U.S. Appl. No. 14/870,744: Filing Receipt, dated Oct. 16, 2015, 3 pages.
U.S. Appl. No. 14/870,744: Applicant Response to Pre-Exam Formalities Notice, dated Feb. 19, 2016, 2 pages.
U.S. Appl. No. 14/870,744: Filing Receipt, dated Mar. 2, 2016, 3 pages.
U.S. Appl. No. 14/870,744: Notice of Publication, dated Jun. 9, 2016, 1 page.
U.S. Appl. No. 11/007,139: Application filed Dec. 7, 2004, 90 pages.
U.S. Appl. No. 11/007,139: Notice to File Missing Parts dated Jan. 19, 2005, 2 pages.
U.S. Appl. No. 11/007,139: Response to Notice to File Missing Parts dated Apr. 1, 2005, 9 pages.
U.S. Appl. No. 11/007,139: Preliminary Amendment filed Apr. 28, 2005, 146 pages.
U.S. Appl. No. 11/007,139: Non-final Office Action dated May 14, 2007, 58 pages.
U.S. Appl. No. 11/007,139: Amendment filed Oct. 15, 2007, 32 pages.
U.S. Appl. No. 11/007,139: Supplemental Response filed Oct. 17, 2007, 7 pages.
U.S. Appl. No. 11/007,139: Non-final Office Action dated Jan. 2, 2008 with Examiner's search results, 21 pages.
U.S. Appl. No. 11/007,139: Amendment filed Apr. 2, 2008, 30 pages.
U.S. Appl. No. 11/007,139: Final Office Action dated Aug. 15, 2008, 30 pages.
U.S. Appl. No. 11/007,139: Amendment filed Oct. 15, 2008, 26 pages.
U.S. Appl. No. 11/007,139: Advisory Action dated Oct. 22, 2008, 26 pages.
U.S. Appl. No. 11/007,139: RCE with Amendment filed Nov. 14, 2008, 32 pages.
U.S. Appl. No. 11/007,139: Non-final Office Action dated Dec. 8, 2008, 24 pages.
U.S. Appl. No. 11/007,139: Amendment filed May 8, 2009, 31 pages.
U.S. Appl. No. 11/007,139: Final Office Action dated Aug. 4, 2009, 26 pages.
U.S. Appl. No. 11/007,139: Amendment filed Dec. 4, 2009, 28 pages.
U.S. Appl. No. 11/007,139: Advisory Action dated Dec. 14, 2009, 4 pages.
U.S. Appl. No. 11/007,139: RCE with amendment filed Jan. 4, 2010, 27 pages.
U.S. Appl. No. 11/007,139: Non-Final Office Action dated Jan. 27, 2010, 31 pages.
U.S. Appl. No. 11/007,139: Response to Non-Final Office Action filed Apr. 27, 2010, 30 pages.
U.S. Appl. No. 11/007,139: Office Action dated Jul. 20, 2010, 20 pages.
U.S. Appl. No. 11/007,139: Office Action response dated Oct. 20, 2010, 33 pages.
U.S. Appl. No. 11/007,139: Advisory Action dated Oct. 25, 2010, 2 pages.
U.S. Appl. No. 11/007,139: Office Action response dated Nov. 18, 2010, 24 pages.
U.S. Appl. No. 11/007,139: Advisory Action dated Dec. 1, 2010, 4 pages.
U.S. Appl. No. 11/007,139: Office Action response and Notice of Appeal dated Dec. 20, 2010, 29 pages.
U.S. Appl. No. 11/007,139: Office Action dated Jan. 3, 2011, 24 pages.
U.S. Appl. No. 11/007,139: Office Action response, dated May 3, 2011, 27 pages.
U.S. Appl. No. 11/007,139: Final Office Action, dated Jul. 18, 2011, 23 pages.
U.S. Appl. No. 11/007,139: Amendment after final dated Oct. 18, 2011, 30 pages.
U.S. Appl. No. 11/007,139: Advisory Action and rule 312 amendment, dated Nov. 4, 2011, 4 pages.
U.S. Appl. No. 11/007,139: Notice of Appeal filed Nov. 16, 2011, 1 page.
U.S. Appl. No. 11/007,139: Appeal Brief filed May 1, 2012, 93 pages.
U.S. Appl. No. 11/007,139: Notice of defective appeal brief, dated May 7, 2012, 3 pages.
U.S. Appl. No. 11/007,139: Appeal Brief filed May 15, 2012, 9 pages.
U.S. Appl. No. 11/007,139: Examiner's answer to appeal brief, dated Aug. 20, 2012, 35 pages.
U.S. Appl. No. 11/007,139: Reply Brief, dated Oct. 22, 2012, 29 pages.
U.S. Appl. No. 11/007,139: Appeal Docketing Notice, dated Nov. 6, 2012, 2 pages.
U.S. Appl. No. 11/007,139: Patent Board Decision, dated Jul. 24, 2015, 8 pages.
U.S. Appl. No. 11/007,139: RCE, dated Sep. 18, 2015, 19 pages.
U.S. Appl. No. 11/007,139: Non-Final Rejection, dated Dec. 31, 2015, 10 pages.
U.S. Appl. No. 11/007,139: Amendment/Req. Reconsideration-After Non-Final Rejection, dated Mar. 28, 2016, 19 pages.
U.S. Appl. No. 11/007,139: Final Rejection, dated Jun. 20, 2016, 12 pages.
U.S. Appl. No. 11/007,139: Response After Final Action, dated Jul. 29, 2016, 17 pages.

(56) References Cited

OTHER PUBLICATIONS

U.S. Appl. No. 11/007,139: Notice of Allowance and Fees, dated Aug. 23, 2016, 10 pages.
U.S. Appl. No. 11/007,139: Filing Receipt, dated Sep. 2, 2016, 3 pages.
U.S. Appl. No. 15/043,267: Application as filed Feb. 12, 2016, 92 pages.
U.S. Appl. No. 15/043,267: Preliminary Amendment, dated Feb. 12, 2016, 7 pages.
U.S. Appl. No. 15/043,267: Filing Receipt, dated Mar. 7, 2016, 3 pages.
U.S. Appl. No. 15/043,267: Preliminary Amendment, dated Jun. 10, 2016, 9 pages.
U.S. Appl. No. 15/043,267: Filing Receipt, dated Oct. 25, 2016, 3 pages.
U.S. Appl. No. 11/006,320, filed Dec. 6, 2004, 75 pages.
U.S. Appl. No. 11/006,320: Response to Missing Parts and Preliminary Amendment filed May 9, 2005, 135 pages.
U.S. Appl. No. 11/006,320: Office Action—Restriction Requirement dated Mar. 26, 2007, 7 pages.
U.S. Appl. No. 11/006,320: Response to Restriction Requirement filed Apr. 27, 2007, 34 pages.
U.S. Appl. No. 11/006,320: Notice of Non-Compliant Amendment dated Jul. 6, 2007, 3 pages.
U.S. Appl. No. 11/006,320: Response to Non-Compliant Amendment filed Jul. 25, 2007, 33 pages.
U.S. Appl. No. 11/006,320: Non-final Office Action dated Oct. 1, 2007, 24 pages.
U.S. Appl. No. 11/006,320: Amendment filed Jan. 29, 2008, 45 pages.
U.S. Appl. No. 11/006,320: Notice of Non-Compliant Amendment dated Apr. 8, 2008, 4 pages.
U.S. Appl. No. 11/006,320: Amendment filed May 5, 2008, 44 pages.
U.S. Appl. No. 11/006,320: Non-final Office Action dated Aug. 15, 2008, 33 pages.
U.S. Appl. No. 11/006,320: Amendment filed Nov. 14, 2008, 40 pages.
U.S. Appl. No. 11/006,320: Office Action—Shortened Statutory Period dated Jan. 27, 2009, 2 pages.
U.S. Appl. No. 11/006,320: Amendment filed Apr. 27, 2009, 44 pages.
U.S. Appl. No. 11/006,320: Final Office Action dated Jul. 29, 2009, 13 pages.
U.S. Appl. No. 11/006,320: Amendment filed Nov. 30, 2009, 10 pages.
U.S. Appl. No. 11/006,320: Non-final Office Action dated Dec. 4, 2009, 25 pages.
U.S. Appl. No. 11/006,320: Response to Non-Final Office Action filed Feb. 23, 2010, 11 pages.
U.S. Appl. No. 11/006,320: Final Office Action dated May 25, 2010, 11 pages.
U.S. Appl. No. 11/006,320: Office Action response dated Aug. 24, 2010, 15 pages.
U.S. Appl. No. 11/006,320: Notice of Allowance dated Sep. 17, 2010, 8 pages.
U.S. Appl. No. 11/006,320: Examiner Interview Summary and supplemental Notice of Allowance dated Dec. 17, 2010, 9 pages.
U.S. Appl. No. 11/006,320: Rule 312 Amendment and Issue Fee payment dated Dec. 17, 2010, 10 pages.
U.S. Appl. No. 11/006,320: Issue Notification dated Jan. 12, 2011, 1 page.
U.S. Appl. No. 12/972,326, filed Dec. 17, 2010, 74 pages.
U.S. Appl. No. 12/972,326: Filing receipt and Notice to File Missing Parts dated Jan. 6, 2011, 5 pages.
U.S. Appl. No. 12/972,326: Response to Notice to File Missing parts dated Jan. 26, 2011, 14 pages.
U.S. Appl. No. 12/972,326: Filing Receipt, dated Feb. 18, 2011, 3 pages.
U.S. Appl. No. 12/972,326: Preliminary amendment dated May 20, 2011, 15 pages.
U.S. Appl. No. 12/972,326: Notice of publication and non-compliant amendment dated Jun. 2, 2011, 3 pages.
U.S. Appl. No. 12/972,326: Preliminary amendment dated Jul. 5, 2011, 21 pages.
U.S. Appl. No. 12/972,326: Notice of additional fee due, dated Jul. 12, 2011, 2 pages.
U.S. Appl. No. 12/972,326: Preliminary Amendment dated Aug. 10, 2011, 7 pages.
U.S. Appl. No. 12/972,326: Non-Final Office Action, dated Feb. 23, 2012, 9 pages.
U.S. Appl. No. 12/972,326: Abandonment, dated Sep. 18, 2012, 2 pages.
U.S. Appl. No. 13/014,677, filed Jan. 26, 2011, 90 pages.
U.S. Appl. No. 13/014,677: Notice to file missing parts and filing receipt, dated Mar. 23, 2011, 5 pages.
U.S. Appl. No. 13/014,677: Notice of Abandonment dated Nov. 29, 2011, 2 pages.
U.S. Appl. No. 11/006,848: Application as filed Dec. 7, 2004, 59 pages.
U.S. Appl. No. 11/006,848: Notice to File Missing Parts dated Mar. 18, 2005, 2 pages.
U.S. Appl. No. 11/006,848: Response to Notice to File Missing Parts dated May 3, 2005, 101 pages.
U.S. Appl. No. 11/006,848: Non-Final Office Action dated Apr. 4, 2007, 11 pages.
U.S. Appl. No. 11/006,848: Response to Non-Final Office Action dated Oct. 3, 2007, 20 pages.
U.S. Appl. No. 11,006,848: Supplemental Amendment dated Nov. 13, 2007, 4 pages.
U.S. Appl. No. 11/006,848: Non-Final Office Action dated Feb. 5, 2008, 16 pages.
U.S. Appl. No. 11/006,848: Response to Non-Final Office Action filed Aug. 4, 2008, 27 pages.
U.S. Appl. No. 11/006,848: Final Office Action dated Dec. 2, 2008, 30 pages.
U.S. Appl. No. 11/006,848: RCE filed May 4, 2009, 24 pages.
U.S. Appl. No. 11/006,848: Notice of Allowance dated Jun. 11, 2009, 8 pages.
U.S. Appl. No. 11/006,848: Issue fee dated Sep. 11, 2009, 10 pages.
U.S. Appl. No. 11/006,848: Issue Notification dated Oct. 28, 2009, 1 page.
U.S. Appl. No. 12/573,829, filed Oct. 5, 2009, 64 pages.
U.S. Appl. No. 12/573,829: Notice to File Missing Parts and Filing Receipt dated Oct. 20, 2009, 5 pages.
U.S. Appl. No. 12/573,829: Preliminary Amendment dated Dec. 21, 2009, 17 pages.
U.S. Appl. No. 12/573,829: Filing receipt dated Jan. 4, 2010, 5 pages.
U.S. Appl. No. 12/573,829: Notice of Publication dated Apr. 15, 2010, 1 page.
U.S. Appl. No. 12/573,829: Office Action dated Jun. 28, 2010, 35 pages.
U.S. Appl. No. 12/573,829: Office Action Response dated Sep. 28, 2010, 22 pages.
U.S. Appl. No. 12/573,829: Office Action dated Nov. 1, 2010, 29 pages.
U.S. Appl. No. 12/573,829: Office Action Response dated Jan. 3, 2011, 29 pages.
U.S. Appl. No. 12/573,829: Advisory Action dated Jan. 7, 2011, 3 pages.
U.S. Appl. No. 12/573,829: Notice of Appeal dated Jan. 11, 2011, 1 page.
U.S. Appl. No. 12/573,829: Appeal Brief, dated May 4, 2011, 68 pages.
U.S. Appl. No. 12/573,829: Examiner's Answer to Appeal Brief, dated Jul. 21, 2011, 31 pages.
U.S. Appl. No. 12/573,829: Reply brief filed Sep. 21, 2011, 17 pages.
U.S. Appl. No. 12/573,829: Reply brief dated Oct. 5, 2011, 2 pages.
U.S. Appl. No. 12/573,829: Appeal Docketing notice dated Oct. 11, 2011, 2 pages.

(56) References Cited

OTHER PUBLICATIONS

U.S. Appl. No. 12/573,829: Appeal Board Decision, dated May 9, 2014, 10 pages.
U.S. Appl. No. 12/573,829: Request for continued examination, dated Jul. 9, 2014, 19 pages.
U.S. Appl. No. 12/573,829: Non-Final Rejection and Examiner's Search, dated Apr. 28, 2015, 22 pages.
U.S. Appl. No. 12/573,829: Amendment/Req. Reconsideration After Non-Final Rejection, filed Jul. 27, 2015, 21 pages.
U.S. Appl. No. 12/573,829: Final Rejection and Examiner search, dated Sep. 15, 2015, 17 pages.
U.S. Appl. No. 12/573,829: Response After Final Action, dated Nov. 16, 2015, 17 pages.
U.S. Appl. No. 12/573,829: Advisory Action, dated Dec. 2, 2015, 4 pages.
U.S. Appl. No. 12/573,829: Request for Continued Examination and Amendments, dated Dec. 14, 2015, 17 pages.
U.S. Appl. No. 12/573,829: Non-Final Rejection, dated Jun. 13, 2016, 18 pages.
U.S. Appl. No. 12/573,829: Amendment/Req. Reconsideration-After Non-Final Reject, dated Sep. 13, 2016, 24 pages.
U.S. Appl. No. 12/573,829: Filing Receipt, dated Sep. 15, 2016, 3 pages.
U.S. Appl. No. 11/006,841, filed Dec. 7, 2004, 63 pages.
U.S. Appl. No. 11/006,841: Notice to file missing parts dated Jan. 10, 2005, 2 pages.
U.S. Appl. No. 11/006,841: Response to Notice to file missing parts and preliminary amendment dated Apr. 14, 2005, 105 pages.
U.S. Appl. No. 11/006,841: Non-Final OA dated Apr. 6, 2007, 16 pages.
U.S. Appl. No. 11/006,841: Response to Non-Final OA dated Sep. 6, 2007, 63 pages.
U.S. Appl. No. 11/006,841: Restriction Requirement dated Nov. 27, 2007, 5 pages.
U.S. Appl. No. 11/006,841: Restriction Requirement response dated Dec. 27, 2007, 36 pages.
U.S. Appl. No. 11/006,841: Restriction Requirement dated Mar. 17, 2008, 9 pages.
U.S. Appl. No. 11/006,841: Response to Restriction Requirement dated Jul. 17, 2008, 33 pages.
U.S. Appl. No. 11/006,841: Final Office Action dated Oct. 29, 2008, 54 pages.
U.S. Appl. No. 11/006,841: Response to Final Office Action dated Dec. 29, 2008, 45 pages.
U.S. Appl. No. 11/006,841: Advisory Action dated Jan. 6, 2009, 3 pages.
U.S. Appl. No. 11/006,841: RCE dated Apr. 23, 2009, 48 pages.
U.S. Appl. No. 11/006,841: Supplemental Response dated Jun. 26, 2009, 34 pages.
U.S. Appl. No. 11/006,841: Notice of Allowance dated Jun. 29, 2009, 40 pages.
U.S. Appl. No. 11/006,841: Issue Fee dated Sep. 29, 2009, 4 pages.
U.S. Appl. No. 11/006,841: Issue Notificaiton dated Nov. 11, 2009, 1 page.
U.S. Appl. No. 12/578,411: Continuation application filed Oct. 13, 2009, 75 pages.
U.S. Appl. No. 12/578,411: Notice of Missing Parts dated Oct. 28, 2009, 6 pages.
U.S. Appl. No. 12/578,411: Response to Missing Parts filed Dec. 28, 2009, 25 pages.
U.S. Appl. No. 12/578,411: Filing Receipt dated Jan. 7, 2010, 3 pages.
U.S. Appl. No. 12/578,411: Notice of Publication dated Apr. 15, 2010, 1 page.
U.S. Appl. No. 12/578,411: Restriction requirement dated Jun. 8, 2011, 6 pages.
U.S. Appl. No. 12/578,411: Response to restriction requirement dated Jul. 6, 2011, 19 pages.
U.S. Appl. No. 12/578,411: Non-Final Office Action, dated Aug. 23, 2011, 19 pages.
U.S. Appl. No. 12/578,411: Non-Final Office Action response dated Dec. 22, 2011, 38 pages.
U.S. Appl. No. 12/578,411: Final Rejection dated Jan. 20, 2012, 16 pages.
U.S. Appl. No. 12/578,411: Amendment, dated May 21, 2012, 23 pages.
U.S. Appl. No. 12/578,411: Advisory Action, dated May 31, 2012, 4 pages.
U.S. Appl. No. 12/578,411: RCE, dated Jun. 12, 2012, 38 pages.
U.S. Appl. No. 12/578,411: Notice of Allowance, dated Aug. 19, 2013, 19 pages.
U.S. Appl. No. 12/578,411: Issue fee payment and Rule 312 amendment, dated Nov. 14, 2013, 14 pages.
U.S. Appl. No. 12/578,411: Examiner response to rule 312 amendment, dated Nov. 19, 2013, 2 pages.
U.S. Appl. No. 12/578,411: Response to Amendment under rule 312, dated Dec. 3, 2013, 3 pages.
U.S. Appl. No. 12/578,411: Issue Notification, dated Dec. 18, 2013, 1 page.
U.S. Appl. No. 14/086,837, filed Nov. 21, 2013, 68 Pages.
U.S. Appl. No. 14/086,837: Notice to File Missing Parts, dated Dec. 12, 2013, 5 Pages.
U.S. Appl. No. 14/086,837: Applicant Response to Pre-Exam Formalities Notice, dated Jun. 11, 2014, 26 Pages.
U.S. Appl. No. 14/086,837: Notice of Publication, dated Sep. 25, 2014, 4 Pages.
U.S. Appl. No. 14/086,837: Terminal Disclaimer, filed Nov. 14, 2014, 1 page.
U.S. Appl. No. 14/086,837: Examiner's search strategy and results, dated Dec. 2, 2014, 9 pages.
U.S. Appl. No. 14/086,837: Notice of Allowance and Fees, dated Dec. 2, 2014, 17 pages.
U.S. Appl. No. 14/086,837: Amendment After Notice of Allowance, filed Feb. 27, 2015, 9 pages.
U.S. Appl. No. 14/086,837: Issue Fee Payment, filed Feb. 27, 2015, 1 page.
U.S. Appl. No. 14/086,837: Issue Notification, dated May 6, 2015, 1 page.
U.S. Appl. No. 14/635,836, filed Mar. 2, 2015, 70 pages.
U.S. Appl. No. 14/635,836: Filing Receipt, dated Mar. 12, 2015, 3 pages.
U.S. Appl. No. 14/635,836: Notice to File Missing Parts, dated Mar. 12, 2015, 2 pages.
U.S. Appl. No. 14/635,836: Applicant Response to Pre-Exam Formalities Notice, filed May 12, 2015, 40 pages.
U.S. Appl. No. 14/635,836: Filing Receipt, dated May 19, 2015, 3 pages.
U.S. Appl. No. 14/635,836: Notice of Publication, dated Aug. 27, 2015, 1 page.
U.S. Appl. No. 14/635,836: Electronic Terminal Disclaimer Approved and filed, Nov. 13, 2015, 3 pages.
U.S. Appl. No. 14/635,836: Notice of Allowance and Fees Due, dated Apr. 18, 2016, 25 pages.
U.S. Appl. No. 15/250,118: Application as filed Aug. 29, 2016, 71 pages.
U.S. Appl. No. 15/250,118: Preliminary Amendment, dated Aug. 29, 2016, 20 pages.
U.S. Appl. No. 15/250,118: Filing Receipt, dated Sep. 9, 2016, 3 pages.
U.S. Appl. No. 11/006,440, filed Dec. 6, 2004, 85 pages.
U.S. Appl. No. 11/006,440: Notice to file missing parts, dated Jan. 11, 2005, 2 pages.
U.S. Appl. No. 11/006,440: Response to Notice to file missing parts dated Mar. 15, 2005, 8 pages.
U.S. Appl. No. 11/006,440: Preliminary Amendment dated Apr. 28, 2005, 140 pages.
U.S. Appl. No. 11/006,440: Preliminary Amendment and Substitute Specification dated Oct. 10, 2006, 139 pages.
U.S. Appl. No. 11/006,440: Restriction Requirement dated Mar. 29, 2007, 5 pages.
U.S. Appl. No. 11/006,440: Response to Restriction Requirement dated Apr. 30, 2007, 42 pages.

(56) References Cited

OTHER PUBLICATIONS

U.S. Appl. No. 11/006,440: Non-Final Office Action dated Jun. 21, 2007, 15 pages.
U.S. Appl. No. 11/006,440: Response to Non-Final Office Action dated Nov. 20, 2007, 42 pages.
U.S. Appl. No. 11/006,440: Final Office Action dated Feb. 6, 2008, 13 pages.
U.S. Appl. No. 11/006,440: Response to Final Office Action dated Apr. 7, 2008, 34 pages.
U.S. Appl. No. 11/006,440: Advisory Action dated May 9, 2008, 3 pages.
U.S. Appl. No. 11/006,440: Notice of appeal dated Aug. 4, 2008, 1 page.
U.S. Appl. No. 11/006,440: RCE dated Nov. 4, 2008, 39 pages.
U.S. Appl. No. 11/006,440: Final Office Action dated Jan. 23, 2009, 22 pages.
U.S. Appl. No. 11/006,440: Amendment after Final dated Apr. 23, 2009, 34 pages.
U.S. Appl. No. 11/006,440: Supplemental Amendment dated Jul. 17, 2009, 29 pages.
U.S. Appl. No. 11/006,440: Notice of Allowance dated Jul. 31, 2009, 15 pages.
U.S. Appl. No. 11/006,440: Examiner's Amendment and Reasons for Allowance dated Sep. 3, 2009, 9 pages.
U.S. Appl. No. 11/006,440: Issue Fee dated Nov. 2, 2009, 12 pages.
U.S. Appl. No. 11/006,440: Issue Notification dated Dec. 2, 2009, 1 page.
U.S. Appl. No. 12/627,816: Continuation application filed Nov. 30, 2009, 95 pages.
U.S. Appl. No. 12/627,816: Notice of Missing Parts dated Dec. 15, 2009, 2 pages.
U.S. Appl. No. 12/627,816: Respone to Missing Parts filed Apr. 12, 2010, 21 pages.
U.S. Appl. No. 12/627,816: Filing Receipt dated Apr. 20, 2010, 3 pages.
U.S. Appl. No. 12/627,816: Notice of Publication dated Jul. 29, 2010, 1 page.
U.S. Appl. No. 12/627,816: Non-Final OA, dated May 5, 2011, 19 pages.
U.S. Appl. No. 12/627,816: Non-Final OA response, dated Nov. 7, 2011, 12 pages.
U.S. Appl. No. 12/627,816: Final Rejection dated Nov. 17, 2011, 18 pages.
U.S. Appl. No. 12/627,816: RCE dated Feb. 17, 2012, 20 pages.
U.S. Appl. No. 12/627,816: Terminal disclaimer review, dated Mar. 7, 2012, 1 page.
U.S. Appl. No. 12/627,816: Notice of Allowance, dated Aug. 1, 2013, 16 pages.
U.S. Appl. No. 12/627,816: Issue fee payment and Rule 312 amendment, dated Nov. 1, 2013, 14 pages.
U.S. Appl. No. 12/627,816: Examiner response to rule 312 amendment, dated Nov. 13, 2013, 2 pages.
U.S. Appl. No. 12/627,816: Issue Notification, dated Nov. 26, 2013, 1 page.
U.S. Appl. No. 14/086,808, filed Nov. 21, 2013, 87 Pages.
U.S. Appl. No. 14/086,808: Notice to File Missing Parts and Filing Receipt, dated Dec. 11, 2013, 5 Pages.
U.S. Appl. No. 14/086,808: Applicant Response to Pre-Exam Formalities Notice, dated Jun. 11, 2014, 53 Pages.
U.S. Appl. No. 14/086,808: Filing receipt, dated Jun. 17, 2014, 3 Pages.
U.S. Appl. No. 14/086,808: Notice of Publication, dated Sep. 25, 2014, 1 Page.
U.S. Appl. No. 14/086,808: Terminal Disclaimer, filed Oct. 24, 2014, 2 pages.
U.S. Appl. No. 14/086,808: Terminal Disclaimer Review Decision, dated Oct. 29, 2014, 1 page.
U.S. Appl. No. 14/086,808: Terminal Disclaimer, filed Nov. 4, 2014, 2 pages.
U.S. Appl. No. 14/086,808: Terminal Disclaimer Review Decision, dated Nov. 13, 2014, 1 page.
U.S. Appl. No. 14/086,808: Examiner's search strategy and results, dated Nov. 17, 2014, 5 pages.
U.S. Appl. No. 14/086,808: Notice of Allowance and fees, dated Nov. 17, 2014, 16 pages.
U.S. Appl. No. 14/086,808: Issue Fee Payment and Rule 312 amendment, filed Feb. 17, 2015, 1 page.
U.S. Appl. No. 14/086,808: Amendment After Notice of Allowance, dated Feb. 17, 2015, 17 pages.
U.S. Appl. No. 14/086,808: Response to Amendment under Rule 312, dated Feb. 20, 2015, 2 pages.
U.S. Appl. No. 14/086,808: Response to Amendment under Rule 312, dated Feb. 25, 2015, 3 pages.
U.S. Appl. No. 14/086,808: Issue Notification, dated Mar. 18, 2015, 1 page.
U.S. Appl. No. 14/625,473, filed Feb. 18, 2015, 92 pages.
U.S. Appl. No. 14/625,473: Filing Receipt, dated Mar. 18, 2015, 3 pages.
U.S. Appl. No. 14/625,473: Notice to File Missing Parts, dated Mar. 18, 2015.
U.S. Appl. No. 14/625,473: Response to Pre-Exam Formalities Notice and Preliminary Amendment, filed May 18, 2015, 28 pages.
U.S. Appl. No. 14/625,473: Filing Receipt, dated May 20, 2015, 3 pages.
U.S. Appl. No. 14/625,473: Notice of Publication, dated Aug. 27, 2015, 1 page.
U.S. Appl. No. 14/625,473: Electronic Terminal Disclaimer Filed and Approved, Nov. 13, 2015, 3 pages.
U.S. Appl. No. 14/625,473: Notice of Allowance, dated Mar. 28, 2016, 19 pages.
U.S. Appl. No. 14/625,473: Issue Fee Payment and Amendments after Notice of Allowance, dated Jun. 28, 2016, 24 pages.
U.S. Appl. No. 14/625,473: Response to Amendment under Rule 312, dated Jun. 30, 2016, 1 page.
U.S. Appl. No. 14/625,473: Issue Notification, dated Jul. 20, 2016, 1 page.
U.S. Appl. No. 11/006,446: Application filed Dec. 6, 2004, 91 pages.
U.S. Appl. No. 11/006,446: Notice of Missing Parts dated Jan. 24, 2005, 3 pages.
U.S. Appl. No. 11/006,446: Response to Notice to File Missing Parts dated Mar. 29, 2005, 8 pages.
U.S. Appl. No. 11/006,446: Preliminary Amendment filed Apr. 28, 2005, 118 pages.
U.S. Appl. No. 11/006,446: Office Action—Restriction Requirement dated Apr. 4, 2007, 5 pages.
U.S. Appl. No. 11/006,446: Response to Office Action—Restriction Requirement filed May 3, 2007, 6 pages.
U.S. Appl. No. 11/006,446: Non-final Office Action dated Jul. 26, 2007, 45 pages.
U.S. Appl. No. 11/006,446: Amendment filed Nov. 26, 2007, 38 pages.
U.S. Appl. No. 11/006,446: Non-final Office Action dated Feb. 20, 2008, 67 pages.
U.S. Appl. No. 11/006,446: Amendment filed Jul. 21, 2008, 33 pages.
U.S. Appl. No. 11/006,446: Final Office Action dated Oct. 28, 2008, 49 pages.
U.S. Appl. No. 11/006,446: Amendment filed Dec. 29, 2008, 33 pages.
U.S. Appl. No. 11/006,446: Advisory Action dated Jan. 7, 2009, 4 pages.
U.S. Appl. No. 11/006,446: RCE with Amendment filed Apr. 28, 2009, 38 pages.
U.S. Appl. No. 11/006,446: Non-final Office Action dated Jul. 7, 2009, 41 pages.
U.S. Appl. No. 11/006,446: Examiner Interview Summary and Search Results dated Oct. 26, 2009, 6 pages.
U.S. Appl. No. 11/006,446: Amendment dated Dec. 7, 2009, 33 pages.
U.S. Appl. No. 11/006,446: Examiner Interview Summary dated Mar. 19, 2010, 4 pages.

(56) References Cited

OTHER PUBLICATIONS

U.S. Appl. No. 11/006,446: Notice of Allowance/Allowability dated Mar. 19, 2010, 29 pages.
U.S. Appl. No. 11/006,446: Issue Fee Payment and 312 Amendment filed Jun. 21, 2010, 23 pages.
U.S. Appl. No. 11/006,446: Rule 312 Amendment dated Aug. 19, 2010, 2 pages.
U.S. Appl. No. 11/006,446: Formal drawings dated Aug. 25, 2010, 29 pages.
U.S. Appl. No. 11/006,446: Issue Notification dated Sep. 1, 2010, 1 page.
U.S. Appl. No. 12/830,236: Divisional Application filed Jul. 2, 2010, 103 pages.
U.S. Appl. No. 12/830,236: Notice to File Corrected Application Papers dated Jul. 16, 2010, 5 pages.
U.S. Appl. No. 12/830,236: Response to Notice to File Corrected Application Papers dated Aug. 25, 2010, 32 pages.
U.S. Appl. No. 12/830,236: Filing receipt dated Sep. 3, 2010, 3 pages.
U.S. Appl. No. 12/830,236: Notice of Publication dated Dec. 16, 2010, 1 page.
U.S. Appl. No. 12/830,236: Restriction requirement dated Mar. 18, 2011, 6 pages.
U.S. Appl. No. 12/830,236: Restriction requirement response, dated Apr. 18, 2011, 5 pages.
U.S. Appl. No. 12/830,236: Non-Final Office Action, dated May 11, 2011, 10 pages.
U.S. Appl. No. 12/830,236: Response to Non-Final Office Action dated Jul. 6, 2011, 18 pages.
U.S. Appl. No. 12/830,236: Final Office Action, dated Oct. 14, 2011, 18 pages.
U.S. Appl. No. 12/830,236: Amendment after final, filed Jan. 17, 2012, 26 pages.
U.S. Appl. No. 12/830,236: Advisory Action, dated Feb. 8, 2012, 6 pages.
U.S. Appl. No. 12/830,236: Notice of Appeal filed Mar. 8, 2012, 3 pages.
U.S. Appl. No. 12/830,236: RCE, filed Jun. 5, 2012, 23 pages.
U.S. Appl. No. 12/830,236: Non-Final Office Action, dated Jul. 31, 2012, 18 pages.
U.S. Appl. No. 12/830,236: Amendment, filed Nov. 1, 2012, 27 pages.
U.S. Appl. No. 12/830,236: Final Office Action, dated Feb. 27, 2013, 35 pages.
U.S. Appl. No. 12/830,236: Response after final, dated Jun. 27, 2013, 36 pages.
U.S. Appl. No. 12/830,236: Advisory action, dated Jul. 12, 2013, 4 pages.
U.S. Appl. No. 12/830,236: Notice of appeal, filed Jul. 19, 2013, 2 pages.
U.S. Appl. No. 12/830,236: Appeal brief, filed Sep. 18, 2013, 44 pages.
U.S. Appl. No. 12/830,236: Examiners answer to appeal brief, dated Dec. 18, 2013, 35 pages.
U.S. Appl. No. 12/830,236: Reply Brief as filed Feb. 18, 2014, 16 Pages.
U.S. Appl. No. 12/830,236: Appeal Docketing Notice, dated Mar. 21, 2014, 2 Pages.
U.S. Appl. No. 12/830,236: Patent Board Decision, dated Mar. 9, 2016, 6 pages.
U.S. Appl. No. 12/830,236: RCE and Amendments, dated Apr. 27, 2016, 15 pages.
U.S. Appl. No. 12/830,236: Non-Final Rejection and Examiner Search, dated Jun. 29, 2016, 75 pages.
U.S. Appl. No. 12/830,236: Amendment/Req. Reconsideration—After Non-Final Reject, dated Sep. 6, 2016, 12 pages.
U.S. Appl. No. 11/385,257: Application filed Mar. 20, 2006, 118 pages.
U.S. Appl. No. 11/385,257: Notice of Missing Parts dated May 3, 2006, 2 pages.
U.S. Appl. No. 11/385,257: Response to Missing Parts filed Aug. 3, 2006, 46 pages.
U.S. Appl. No. 11/385,257: Notice of Publication dated Nov. 30, 2006, 1 page.
U.S. Appl. No. 11/385,257: Non-final Office Action dated Apr. 29, 2008, 44 pages.
U.S. Appl. No. 11/385,257: Amendment filed Jul. 29, 2008, 29 pages.
U.S. Appl. No. 11/385,257: Final Office Action dated Dec. 9, 2008, 47 pages.
U.S. Appl. No. 11/385,257: RCE with Amendment filed May 11, 2009, 38 pages.
U.S. Appl. No. 11/385,257: Supplemental Amendment filed May 26, 2009, 32 pages.
U.S. Appl. No. 11/385,257: Notice of Non-Compliant Amendment dated Jun. 1, 2009, 3 pages.
U.S. Appl. No. 11/385,257: Amendment filed Jun. 30, 2009, 34 pages.
U.S. Appl. No. 11/385,257: Non-final Office Action dated Sep. 14, 2009, 60 pages.
U.S. Appl. No. 11/385,257: Response to Non-Final Office Action filed Jan. 13, 2010, 34 pages.
U.S. Appl. No. 11/385,257: Final Office Action dated Apr. 12, 2010, 47 pages.
U.S. Appl. No. 11/385,257: RCE dated Aug. 12, 2010, 35 pages.
U.S. Appl. No. 11/385,257: Office Action dated Sep. 30, 10, 39 pages.
U.S. Appl. No. 11/385,257: Office Action response, dated Mar. 29, 2011, 31 pages.
U.S. Appl. No. 11/385,257: Final Rejection dated Jun. 1, 2011, 40 pages.
U.S. Appl. No. 11/385,257: Request for continued Examination dated Nov. 1, 2011, 30 pages.
U.S. Appl. No. 11/385,257: Non-Final Office Action, dated Jan. 9, 2012, 40 pages.
U.S. Appl. No. 11/385,257: Amendment, dated Apr. 6, 2012, 30 pages.
U.S. Appl. No. 11/385,257: Notice of allowance and Examiner interview summary, dated Jun. 22, 2012, 36 pages.
U.S. Appl. No. 11/385,257: Office communication concerning previous IDS filing, dated Oct. 4, 2012, 4 pages.
U.S. Appl. No. 11/385,257: Miscellaneous Communication to Applicant, dated Oct. 15, 2012, 3 pages.
U.S. Appl. No. 11/385,257: Rule 312 Amendment, dated Dec. 12, 2012, 10 pages.
U.S. Appl. No. 11/385,257: Issue Notification, dated Dec. 22, 2012, 1 page.
U.S. Appl. No. 13/625,812, filed Sep. 24, 2012, 123 pages.
U.S. Appl. No. 13/625,812: Notice to file missing parts, dated Oct. 15, 2012, 6 pages.
U.S. Appl. No. 13/625,812: Response to Notice to file missing parts and preliminary amendment, dated Mar. 8, 2013, 47 pages.
U.S. Appl. No. 13/625,812: Notice of incomplete reply, dated Mar. 15, 2013, 3 pages.
U.S. Appl. No. 13/625,812: Response to incomplete reply notice, dated Apr. 2, 2013, 5 pages.
U.S. Appl. No. 13/625,812: Non-Final office action, dated Jul. 26, 2013, 29 pages.
U.S. Appl. No. 13/625,812: Publication notice, dated Aug. 1, 2013, 1 page.
U.S. Appl. No. 13/625,812: Response to non-final office action, dated Oct. 9, 2013, 15 pages.
U.S. Appl. No. 13/625,812: Final rejection, dated Dec. 3, 2013, 28 pages.
U.S. Appl. No. 13/625,812: Response After Final Action, dated Apr. 1, 2014, 1 Page.
U.S. Appl. No. 13/625,812: Advisory Action (PTOL-303), dated Apr. 9, 2014, 3 Pages.
U.S. Appl. No. 13/625,812: Notice of Appeal, filed May 5, 2014, 1 Page.
U.S. Appl. No. 13/625,812: Request for Continued Examination, dated Aug. 4, 2014, 18 Pages.

(56) References Cited

OTHER PUBLICATIONS

U.S. Appl. No. 13/625,812: Request for Corrected Filing Receipt, dated Aug. 21, 2014, 6 Pages.
U.S. Appl. No. 13/625,812: Filing Receipt, dated Aug. 27, 2014, 3 Pages.
U.S. Appl. No. 13/625,812: Notice of Allowance and Fees, dated Dec. 9, 2014, 20 pages.
U.S. Appl. No. 13/625,812: Filing Receipt, dated Feb. 2, 2015, 3 pages.
U.S. Appl. No. 13/625,812: Filing Receipt, dated Feb. 6, 2015, 3 pages.
U.S. Appl. No. 13/625,812: Terminal Disclaimer filed Mar. 2, 2015, 1 page.
U.S. Appl. No. 13/625,812: Post Allowance Arguments/Amendments, filed Mar. 6, 2015, 6 pages.
U.S. Appl. No. 13/625,812: Amendment After Notice of Allowance, filed Mar. 9, 2015, 3 pages.
U.S. Appl. No. 13/625,812: Issue Fee Payment, filed Mar. 9, 2015, 1 page.
U.S. Appl. No. 13/625,812: Terminal Disclaimer Review Decision, dated Mar. 12, 2015.
U.S. Appl. No. 14/641,735, filed Mar. 9, 2015, 126 pages.
U.S. Appl. No. 14/641,735: Filing Receipt, dated Mar. 20, 2015, 3 pages.
U.S. Appl. No. 14/641,735: Notice to File Missing Parts, dated Mar. 20, 2015, 2 pages.
U.S. Appl. No. 14/641,735: Notice of Incomplete Reply, dated Jun. 26, 2015, 2 pages.
U.S. Appl. No. 14/641,735: Applicant Response to Pre-Exam Formalities Notice and Amendments, filed Jul. 8, 2015, 32 pages.
U.S. Appl. No. 14/641,735: Electronic Terminal Disclaimer, filed Aug. 27, 2015, 3 pages.
U.S. Appl. No. 14/641,735: Notice of Publication, dated Oct. 29, 2015, 1 page.
U.S. Appl. No. 14/641,735: Preliminary Amendment, dated Jan. 14, 2016, 8 pages.
U.S. Appl. No. 11/319,758: Application filed Dec. 27, 2005, 79 pages.
U.S. Appl. No. 11/319,758: Notice of Missing Parts dated Feb. 1, 2006, 2 pages.
U.S. Appl. No. 11/319,758: Response to Missing Parts filed Jul. 3, 2006, 15 pages.
U.S. Appl. No. 11/319,758: Non-final Office Action dated Nov. 12, 2008, 46 pages.
U.S. Appl. No. 11/319,758: Amendment filed May 12, 2009, 40 pages.
U.S. Appl. No. 11/319,758: Final Office Action dated Aug. 3, 2009, 39 pages.
U.S. Appl. No. 11/319,758: RCE filed Jan. 4, 2010, 45 pages.
U.S. Appl. No. 11/319,758: Non-Final Office Action dated Mar. 30, 2010, 39 pages.
U.S. Appl. No. 11/319,758: Office Action response dated Jul. 29, 2010, 30 pages.
U.S. Appl. No. 11/319,758: Final Office Action dated Oct. 28, 2010, 31 pages.
U.S. Appl. No. 11/319,758: Request for Continued Examination, dated Mar. 28, 2011, 32 pages.
U.S. Appl. No. 11/319,758: Non-Final office action dated Jun. 3, 2011, 31 pages.
U.S. Appl. No. 11/319,758: Non-Final Office Action Response dated Nov. 3, 2011, 29 pages.
U.S. Appl. No. 11/319,758: Final Office Action, dated Jan. 17, 2012, 22 pages.
U.S. Appl. No. 11/319,758: Amendment after final, dated May 17, 2012, 34 pages.
U.S. Appl. No. 11/319,758: Advisory Action, dated Jun. 20, 2012, 3 pages.
U.S. Appl. No. 11/319,758: Amendment after final, dated Jun. 28, 2012, 29 pages.
U.S. Appl. No. 11/319,758: Notice of Allowance and examiner's interview summary, dated Jul. 17, 2012, 10 pages.
U.S. Appl. No. 11/319,758: Issue Fee payment, Rule 312 and Miscellaneous Communication, dated Oct. 12, 2012, 12 pages.
U.S. Appl. No. 11/319,758: Issue Notification, dated Oct. 31, 2012, 1 page.
U.S. Appl. No. 13/632,581, filed Oct. 1, 2012, 88 Pages.
U.S. Appl. No. 13/632,581: Notice to File Missing Parts and Filing Receipt, dated Oct. 22, 2012, 27 Pages.
U.S. Appl. No. 13/632,581: Filing Receipt, dated Mar. 5, 2004, 3 Pages.
U.S. Appl. No. 13/632,581: Notice of Publication, dated Jun. 13, 2013, 1 Page.
U.S. Appl. No. 13/632,581: Non-final Office Action, dated Jul. 3, 2013, 22 Pages.
U.S. Appl. No. 13/632,581: Non-Final Office Action Response, dated Sep. 11, 2013, 23 Pages.
U.S. Appl. No. 13/632,581: Final Office Action, dated Dec. 18, 2013, 27 Pages.
U.S. Appl. No. 13/632,581: Response After Final Action, dated Mar. 18, 2014, 37 Pages.
U.S. Appl. No. 13/632,581: Advisory Action (PTOL-303), dated Apr. 3, 2014, 4 Pages.
U.S. Appl. No. 13/632,581: Notice of Appeal filed Jul. 17, 2014, 2 Pages.
U.S. Appl. No. 13/632,581: Request for Continued Examination, dated Jul. 16, 2014, 23 Pages.
U.S. Appl. No. 13/632,581: Notice Non-Compliant Amendment, dated Oct. 20, 2014, 5 pages.
U.S. Appl. No. 13/632,581: Amendment/Req Reconsideration after Non-Final Reject, filed Nov. 4, 2014, 16 pages.
U.S. Appl. No. 13/632,581: Non-Final Rejection, dated Jan. 27, 2015, 16 pages.
U.S. Appl. No. 13/632,581: Amendment/Req Reconsideration Non-Final Rejection and Amendments, filed Apr. 20, 2015, 24 pages.
U.S. Appl. No. 13/632,581: Final Rejection, dated Jul. 20, 2015, 21 pages.
U.S. Appl. No. 13/632,581: After Final Consideration Request and Response, dated Sep. 21, 2015, 28 pages.
U.S. Appl. No. 13/632,581: Advisory Action and After Final Decision, dated Oct. 2, 2015, 18 pages.
U.S. Appl. No. 13/632,581: RCE and Amendments, dated Nov. 30, 2015, 55 pages.
U.S. Appl. No. 13/632,581: Notice of Allowance and Fees, dated Dec. 17, 2015, 5 pages.
U.S. Appl. No. 13/632,581: Filing Receipt, dated Jan. 22, 2016, 4 pages.
U.S. Appl. No. 13/632,581: Electronic Terminal Disclaimer, dated Mar. 7, 2016, 3 pages.
U.S. Appl. No. 13/632,581: Issue Fee Payment, dated Mar. 16, 2016, 1 page.
U.S. Appl. No. 13/632,581: Amendment after Notice of Allowance, dated Mar. 16, 2016 19 pages.
U.S. Appl. No. 13/632,581: Response to Amendment under Rule 312, dated Mar. 22, 2016, 2 pages.
U.S. Appl. No. 13/632,581: Issue Notification, dated Apr. 13, 2016, 1 page.
U.S. Appl. No. 15/081,612, filed Mar. 25, 2016, 87 Pages.
U.S. Appl. No. 15/081,612: Notice to File Missing Parts and Filing Receipt, dated Apr. 11, 2016, 4 Pages.
U.S. Appl. No. 15/081,612: Filing Receipt, dated Apr. 11, 2016, 3 Pages.
U.S. Appl. No. 15/081,612: Applicant Response to Pre-Exam Formalities Notice and Preliminary Amendments, dated Jun. 13, 2016, 34 pages.
U.S. Appl. No. 15/081,612: Preliminary Amendment, dated Jun. 14, 2016, 4 pages.
U.S. Appl. No. 15/081,612: Filing Receipt, dated Jun. 21, 2016, 3 pages.
U.S. Appl. No. 15/081,612: Non-Final Rejection, dated Jul. 27, 2016, 9 pages.
U.S. Appl. No. 15/081,612: Electronic Terminal Disclaimer, dated Sep. 23, 2016, 3 pages.

(56) References Cited

OTHER PUBLICATIONS

U.S. Appl. No. 15/081,612: Notice of Publication, dated Sep. 29, 2016, 1 page.
U.S. Appl. No. 15/081,612: Amendment/Req. Reconsideration—After Non-Final Reject, dated Oct. 17, 2016, 10 pages.
U.S. Appl. No. 15/081,612: Notice of Allowance and Fees, dated Oct. 27, 2016, 5 pages.
U.S. Appl. No. 11/006,842, filed Dec. 7, 2004, 58 pages.
U.S. Appl. No. 11/006,842: Notice to file missing parts dated Jan. 10, 2005, 2 pages.
U.S. Appl. No. 11/006,842: Response to Notice to file missing parts dated Apr. 1, 2005, 7 pages.
U.S. Appl. No. 11/006,842: Preliminary Amendment dated May 2, 2005, 93 pages.
U.S. Appl. No. 11/006,842: Restriction Requirement dated Jan. 23, 2008, 5 pages.
U.S. Appl. No. 11/006,842: Response to Restriction Requirement dated Feb. 25, 2008, 25 pages.
U.S. Appl. No. 11/006,842: Restriction Requirement dated May 13, 2008, 5 pages.
U.S. Appl. No. 11/006,842: Response to Restriction Requirement dated Aug. 13, 2008, 24 pages.
U.S. Appl. No. 11/006,842: Non-Final Office Action dated Nov. 3, 2008.
U.S. Appl. No. 11/006,842: Response to Non-Final Office Action dated May 4, 2009, 35 pages.
U.S. Appl. No. 11/006,842: Supplemental Response dated Jul. 17, 2009, 23 pages.
U.S. Appl. No. 11/006,842: Notice of Allowance dated Jul. 27, 2009, 13 pages.
U.S. Appl. No. 11/006,842: Issue Fee filed Oct. 27, 2009, 1 page.
U.S. Appl. No. 11/006,842: Issue notification dated Nov. 18, 2009, 1 page.
U.S. Appl. No. 12/613,450: Continuation application filed Nov. 5, 2009, 63 pages.
U.S. Appl. No. 12/613,450: Notice of Missing Parts dated Nov. 18, 2009, 2 pages.
U.S. Appl. No. 12/613,450: Preliminary Amendment and Response to Missing Parts filed Jan. 19, 2010, 16 pages.
U.S. Appl. No. 12/613,450: Filing receipt dated Jan. 27, 2010, 3 pages.
U.S. Appl. No. 12/613,450: Notice of Publication dated May 6, 2010, 1 page.
U.S. Appl. No. 12/613,450: Restriction requirement dated Jun. 10, 2011, 5 pages.
U.S. Appl. No. 12/613,450: Response to restriction requirement dated Jul. 6, 2011, 17 pages.
U.S. Appl. No. 12/613,450: Non-Final Office Action, dated Aug. 25, 2011, 15 pages.
U.S. Appl. No. 12/613,450: Non-Final OA response dated Dec. 27, 2011, 28 pages.
U.S. Appl. No. 12/613,450: Final rejection, dated Feb. 14, 2012, 14 pages.
U.S. Appl. No. 12/613,450: Amendment after final, dated Jun. 8, 2012, 23 pages.
U.S. Appl. No. 12/613,450: Advisory Action, dated Jun. 20, 2012, 4 pages.
U.S. Appl. No. 12/613,450: RCE, dated Jul. 12, 2012, 25 pages.
U.S. Appl. No. 12/613,450: Notice of Allowance, dated Oct. 7, 2013, 20 pages.
U.S. Appl. No. 12/613,450: Electronic Terminal Disclaimer filed and approved, Jan. 2, 2014, 2 pages.
U.S. Appl. No. 12/613,450: Amendment After Final or Under 37CFR 1.312, initialed by the Examiner, dated Jan. 14, 2014, 2 Pages.
U.S. Appl. No. 12/613,450: Issue Notification, dated Jan. 22, 2014, 1 Page.
U.S. Appl. No. 14/149,749, filed Jan. 7, 2014, 59 Pages.
U.S. Appl. No. 14/149,749: Notice to File Missing Parts and Filing Receipt, dated Jan. 23, 2014, 6 Pages.
U.S. Appl. No. 14/149,749: Applicant Response to Pre-exam Formalities Notice, dated May 23, 2014 12 Pages.
U.S. Appl. No. 14/149,749: Applicant Response to Pre-Exam Formalities Notice, dated Aug. 25, 2014, 103 Pages.
U.S. Appl. No. 14/149,749: Filing Receipt, dated Sep. 4, 2014, 3 Pages.
U.S. Appl. No. 14/149,749: Notice of Publication, dated Dec. 11, 2014, 1 page.
U.S. Appl. No. 14/149,749: Electronic Terminal Disclaimer Filed and Approved Feb. 23, 2015.
U.S. Appl. No. 14/149,749: Examiner Initiated Interview Summary, dated Feb. 24, 2015, 2 pages.
U.S. Appl. No. 14/149,749: Notice of Allowance and Fees and Examiner Search, dated Apr. 17, 2015, 30 pages.
U.S. Appl. No. 14/149,749: Amendment after Notice of Allowance, filed May 27, 2015, 10 pages.
U.S. Appl. No. 14/149,749: Issue Fee Payment, filed May 27, 2015, 1 page.
U.S. Appl. No. 14/149,749: Electronic Terminal Disclaimer Filed and Approved, May 27, 2015, 3 pages.
U.S. Appl. No. 14/149,749: Response to Amendment under Rule 312, dated May 29, 2015, 1 page.
U.S. Appl. No. 14/149,749: Response to Amendment under Rule 312, dated Jun. 1, 2015, 3 pages.
U.S. Appl. No. 14/149,749: Issue Notification, dated Jun. 17, 2015, 1 page.
U.S. Appl. No. 14/726,192, filed May 29, 2015, 39 pages.
U.S. Appl. No. 14/726,192: Filing Receipt, dated Jun. 9, 2015, 3 pages.
U.S. Appl. No. 14/726,192: Notice to File Missing Parts, dated Jun. 9, 2015, 2 pages.
U.S. Appl. No. 14/726,192: Applicant Response to Pre-Exam Formalities Notice and Amendments, filed Aug. 12, 2015, 114 pages.
U.S. Appl. No. 14/726,192: Filing Receipt, dated Aug. 20, 2015, 3 pages.
U.S. Appl. No. 14/726,192: Electronic Terminal Disclaimer Filed and Approved, Nov. 20, 2015, 3 pages.
U.S. Appl. No. 14/726,192: Notice of Publication, dated Nov. 27, 2015, 1 page.
U.S. Appl. No. 14/726,192: Issue Fee Payment and Amendment after Notice of Allowance, dated Jul. 18, 2016, 13 pages.
U.S. Appl. No. 14/726,192: Response to Amendment under Rule 312, dated Jul. 21, 2016, 1 page.
U.S. Appl. No. 14/726,192: U.S. Appl. No. 14/726,192: Response to Amendment under Rule 312, dated Jul. 22, 2016, 2 pages.
U.S. Appl. No. 14/726,192: Issue Notification, dated Aug. 3, 2016, 1 page.
U.S. Appl. No. 15/240,964: Application and Preliminary Amendments as filed Aug. 18, 2016, 70 pages.
U.S. Appl. No. 15/240,964: Filing Receipt, dated Aug. 31, 2016, 3 pages.
U.S. Appl. No. 11/320,538: Application filed Dec. 27, 2005, 76 pages.
U.S. Appl. No. 11/320,538: Notice of Missing Parts dated Feb. 2, 2006, 2 pages.
U.S. Appl. No. 11/320,538: Response to Missing Parts filed Aug. 2, 2006, 36 pages.
U.S. Appl. No. 11/320,538: Non-final Office Action dated Apr. 1, 2009, 27 pages.
U.S. Appl. No. 11/320,538: Amendment filed Jul. 1, 2009, 54 pages.
U.S. Appl. No. 11/320,538: Final Office Action dated Nov. 2, 2009, 29 pages.
U.S. Appl. No. 11/320,538: Response to Final Office Action filed Jan. 4, 2010, 23 pages.
U.S. Appl. No. 11/320,538: Advisory Action dated Jan. 19, 2010, 3 pages.
U.S. Appl. No. 11/320,538: RCE and Amendment filed Apr. 2, 2010, 26 pages.
U.S. Appl. No. 11/320,538: Non-Final Office Action dated Jun. 9, 2010, 24 pages.
U.S. Appl. No. 11/320,538: Office action dated Dec. 22, 2010, 10 pages.

(56) References Cited

OTHER PUBLICATIONS

U.S. Appl. No. 11/320,538: Notice of Appeal, dated May 23, 2011, 6 pages.
U.S. Appl. No. 11/320,538: Pre-brief appeal conference decision dated Jun. 30, 2011, 2 pages.
U.S. Appl. No. 11/320,538: Request for Continued Examination dated Dec. 23, 2011, 21 pages.
U.S. Appl. No. 11/320,538: Non-Final Office Action, dated Dec. 19, 2012, 12 pages.
U.S. Appl. No. 11/320,538: Response to Non-final office action, dated Apr. 17, 2013, 20 pages.
U.S. Appl. No. 11/320,538: Notice of allowance, dated Aug. 1, 2013, 25 pages.
U.S. Appl. No. 11/320,538: Issue fee payment, dated Nov. 1, 2013, 7 pages.
U.S. Appl. No. 11/320,538: Rule 312 amendment, dated Nov. 19, 2013, 20 pages.
U.S. Appl. No. 11/320,538: Issue Notification, dated Dec. 4, 2013, 1 page.
U.S. Appl. No. 14/086,741: Application as Filed on Dec. 12, 2013, 77 Pages.
U.S. Appl. No. 14/086,741: Filing Receipt and Notice to File Missing Parts, dated Dec. 12, 2013, 6 Pages.
U.S. Appl. No. 14/086,741: Applicant Response to Pre-Exam Formalities Notice, dated Jun. 12, 2014, 60 Pages.
U.S. Appl. No. 14/086,741: Filing Receipt, dated Jun. 17, 2014, 3 Pages.
U.S. Appl. No. 14/086,741: Notice of Publication, dated Sep. 25, 2014, 1 Page.
U.S. Appl. No. 14/086,741: Terminal Disclaimer as filed Sep. 29, 2014, 1 Page.
U.S. Appl. No. 14/086,741: Terminal Disclaimer Review Decision, dated Sep. 30, 2014, 1 Page.
U.S. Appl. No. 14/086,741: Notice of Allowance and Fees and Examiner Summary, dated Oct. 3, 2014, 21 pages.
U.S. Appl. No. 14/086,741: Notice of Allowance and Fees Due, filed Oct. 3, 2014, 22 pages.
U.S. Appl. No. 14/086,741: Amendment after Notice of Allowance, filed Jan. 5, 2015, 14 pages.
U.S. Appl. No. 14/086,741: Issue Fee Payment, filed Jan. 5, 2015, 1 page.
U.S. Appl. No. 14/086,741: Response to Amendment under Rule 312, dated Jan. 22, 2015, 2 pages.
U.S. Appl. No. 14/086,741: Notice of Allowance and Fees and Examiner Search strategy, dated Mar. 16, 2015, 40 pages.
U.S. Appl. No. 14/086,741: Issue Notification, dated Apr. 1, 2015, 1 page.
U.S. Appl. No. 14/596,154: Application as filed Jan. 13, 2015, 60 pages.
U.S. Appl. No. 14/596,154: Filing Receipt, dated Jan. 27, 2015, 3 pages.
U.S. Appl. No. 14/596,154: Notice to File Missing Parts, dated Jan. 27, 2015, 3 pages.
U.S. Appl. No. 14/596,154: Applicant Response to Pre Exam Formalities Notice with Preliminary Amendments, filed Mar. 27, 2015, 85 pages.
U.S. Appl. No. 14/596,154: Filing Receipt, dated Apr. 2, 2015, 3 pages.
U.S. Appl. No. 14/596,154: Notice of Publication, dated Jul. 9, 2015, 1 page.
U.S. Appl. No. 14/596,154: Electronic Terminal Disclaimer Filed and Approved, Nov. 20, 2015, 3 pages.
U.S. Appl. No. 11/361,500, filed Feb. 23, 2006, 72 pages.
U.S. Appl. No. 11/361,500: Notice to file missing parts dated Mar. 23, 2006, 2 pages.
U.S. Appl. No. 11/361,500: Response to Notice to File Missing Parts dated Jul. 19, 2006, 27 pages.
U.S. Appl. No. 11/361,500: Notice of Publication dated Nov. 16, 2006, 1 page.
U.S. Appl. No. 11/361,500: Office Action dated May 27, 2009, 18 pages.
U.S. Appl. No. 11/361,500: Response to Office Action dated Aug. 27, 2009, 34 pages.
U.S. Appl. No. 11/361,500: Notice of Allowance dated Dec. 11, 2009, 8 pages.
U.S. Appl. No. 11/361,500: Issue Fee Payment and Rule 312 Amendment dated Jan. 6, 2010, 28 pages.
U.S. Appl. No. 11/361,500: Response to Rule 312 Amendment dated Jan. 25, 2010, 4 pages.
U.S. Appl. No. 11/361,500: Issue Notification dated Feb. 24, 2010, 1 page.
U.S. Appl. No. 12/702,243: Continuation Application with Preliminary Amendment filed Feb. 8, 2010, 83 pages.
U.S. Appl. No. 12/702,243: Notice of Missing Parts dated Feb. 25, 2010, 2 pages.
U.S. Appl. No. 12/702,243: Response to Missing Parts filed Apr. 26, 2010, 8 pages.
U.S. Appl. No. 12/702,243: Filing receipt dated May 4, 2010, 3 pages.
U.S. Appl. No. 12/702,243: Notice of Publication dated Aug. 12, 2010, 1 page.
U.S. Appl. No. 12/702,243: Non-Final rejection, dated Aug. 30, 2012, 8 pages.
U.S. Appl. No. 12/702,243: Amendment, dated Nov. 20, 2012, 14 pages.
U.S. Appl. No. 12/702,243: Terminal Disclaimer, dated Jan. 2, 2013, 5 pages.
U.S. Appl. No. 12/702,243: Terminal Disclaimer decision, dated Jan. 4, 2013, 1 page1.
U.S. Appl. No. 12/702,243: Notice of allowance and fees due and examiner interview summary, dated Jan. 10, 2013, pages.
U.S. Appl. No. 12/702,243: Issue notification, dated Apr. 24, 2013, 1 page.
U.S. Appl. No. 13/860,482, filed Apr. 10, 2013, 98 Pages.
U.S. Appl. No. 13/860,482: Notice to File Missing Parts and Filing Receipt, dated May 21, 2013, 5 Pages.
U.S. Appl. No. 13/860,482: Applicant Response to Pre-Exam Formalities Notice, dated Oct. 22, 2013, 3 Pages.
U.S. Appl. No. 13/860,482: Notice of Publication, dated Feb. 6, 2014, 1 Page.
U.S. Appl. No. 13/860,482: Non-Final Office Action, dated Jun. 9, 2014, 11 Pages.
U.S. Appl. No. 13/860,482: Non-Final Office Action Response, dated Sep. 8, 2014, 19 Pages.
U.S. Appl. No. 13/860,482: Terminal Disclaimer Review Decision, dated Sep. 9, 2014, 1 page.
U.S. Appl. No. 13/860,482: Terminal Disclaimer Filed, Oct. 8, 2014, 1 page.
U.S. Appl. No. 13/860,482: Terminal Disclaimer Review Decision, dated Oct. 9, 2014, 1 page.
U.S. Appl. No. 13/860,482: Notice of Allowance and Fees Due, dated Nov. 5, 2014, 8 Pages.
U.S. Appl. No. 13/860,482: Issue Fee Payment and Rule 312 Amendments, filed Feb. 4, 2015, 4 pages.
U.S. Appl. No. 13/860,482: Issue Notification, dated Mar. 4, 2015, 1 page.
U.S. Appl. No. 14/614,292, filed Feb. 4, 2015, 76 pages.
U.S. Appl. No. 14/614,292: Notice to File Missing Parts and Filing Receipt, dated Feb. 20, 2015, 5 pages.
U.S. Appl. No. 14/614,292: Applicant Response to Pre-Exam Formalities Notice and Amendments, filed Apr. 17, 2015, 30 pages.
U.S. Appl. No. 14/614,292: Filing Receipt, dated Apr. 24, 2015, 3 pages.
U.S. Appl. No. 14/614,292: Notice of Publication, dated Aug. 6, 2015, 1 page.
U.S. Appl. No. 14/614,292: Electronic Terminal Disclaimer Filed and Approved, Nov. 20, 2015, 3 pages.
U.S. Appl. No. 14/614,292: Non-Final Rejection, dated May 19, 2016, 10 pages.
U.S. Appl. No. 14/614,292: Amendment/Req. Reconsideration—After Non-Final Rejection, dated Aug. 18, 2016, 20 pages.

(56) References Cited

OTHER PUBLICATIONS

U.S. Appl. No. 14/614,292: Notice of Allowance and Fees, dated Sep. 21, 2016, 8 pages.
U.S. Appl. No. 11/412,417: Application filed Apr. 26, 2006, 96 pages.
U.S. Appl. No. 11/412,417: Notice of Missing Parts dated May 19, 2006, 2 pages.
U.S. Appl. No. 11/412,417: Response to Notice of Missing Parts filed Jul. 19, 2006, 14 pages.
U.S. Appl. No. 11/412,417: Non-final Office Action dated Apr. 1, 2008, 53 pages.
U.S. Appl. No. 11/412,417: Amendment filed Aug. 1, 2008, 34 pages.
U.S. Appl. No. 11/412,417: Final Office Action dated Nov. 13, 2008, 40 pages.
U.S. Appl. No. 11/412,417: RCE and Amendment filed May 12, 2009, 36 pages.
U.S. Appl. No. 11/412,417: Non-final Office Action dated Jun. 30, 2009, 141 pages.
U.S. Appl. No. 11/412,417: Examiner Interview Summary dated Oct. 30, 2009, 3 pages.
U.S. Appl. No. 11/412,417: Amendment filed Oct. 30, 2009, 33 pages.
U.S. Appl. No. 11/412,417: Final Office Action dated Jan. 4, 2010, 37 pages.
U.S. Appl. No. 11/412,417: RCE with Amendment filed May 4, 2010, 27 pages.
U.S. Appl. No. 11/412,417: Supplemental Office Action Response dated Jun. 22, 2010, 22 pages.
U.S. Appl. No. 11/412,417: Notice of Allowance and bibliographic data sheet dated Jul. 6, 2010, 9 pages.
U.S. Appl. No. 11/412,417: RCE dated Oct. 5, 2010, 4 pages.
U.S. Appl. No. 11/412,417: Notice of Allowance and bibliographic data sheet dated Oct. 26, 2010, 4 pages.
U.S. Appl. No. 11/412,417: Issue Fee Payment and Comments on Reasons for Allowance dated Jan. 26, 2011, 6 pages.
U.S. Appl. No. 11/412,417: Issue Notification dated Feb. 9, 2011, 1 page.
U.S. Appl. No. 13/030,084: Application filed Feb. 17, 2011, 103 pages.
U.S. Appl. No. 13/030,084: Filing receipt and Notice to File Missing parts dated Mar. 3, 2011, 6 pages.
U.S. Appl. No. 13/030,084: Response to Notice to File Missing Parts, dated Aug. 3, 2011, 23 pages.
U.S. Appl. No. 13/030,084: Updated filing receipt, dated Aug. 11, 2011, 3 pages.
U.S. Appl. No. 13/030,084: Non-Final Rejection dated Oct. 26, 2011, 34 pages.
U.S. Appl. No. 13/030,084: Notice of Publication dated Nov. 17, 2011, 1 page.
U.S. Appl. No. 13/030,084: Amendment, dated Jan. 26, 2012, 35 pages.
U.S. Appl. No. 13/030,084: Notice regarding non-compliant amendment, dated Jan. 31, 2012, 4 pages.
U.S. Appl. No. 13/030,084: Amendment, dated Feb. 9, 2012, 35 pages.
U.S. Appl. No. 13/030,084: Final Rejection, dated Mar. 28, 2012, 62 pages.
U.S. Appl. No. 13/030,084: Amendment after final, dated Jun. 14, 2012, 88 pages.
U.S. Appl. No. 13/030,084: Advisory Action, dated Jun. 26, 2012, 4 pages.
U.S. Appl. No. 13/030,084: RCE, dated Jul. 23, 2012, 89 pages.
U.S. Appl. No. 13/030,084: Notice regarding non-compliant amendment, dated Jul. 25, 2012, 2 pages.
U.S. Appl. No. 13/030,084: Amendment, dated Jan. 2, 2013, 40 pages.
U.S. Appl. No. 13/030,084: Refund request, dated Jan. 23, 2013 17 pages.
U.S. Appl. No. 13/030,084: Non-Final office action, dated Apr. 30, 2013, 39 pages.
U.S. Appl. No. 13/030,084: Response to non-final office action, dated Jul. 30, 2013, 28 pages.
U.S. Appl. No. 13/030,084: Non-final office action, dated Oct. 10, 2013, 44 pages.
U.S. Appl. No. 13/030,084: Response after Non-Final Reject, dated Jan. 2, 2014, 1 Page.
U.S. Appl. No. 13/030,084: Final Rejection, dated Mar. 19, 2014, 41 Pages.
U.S. Appl. No. 13/030,084: Amendment Submitted/Entered with Filing of CPA/RCE, dated May 19, 2014, 38 Pages.
U.S. Appl. No. 13/030,084: Advisory Action (PTOL-303), dated Jun. 6, 2014, 4 Pages.
U.S. Appl. No. 13/030,084: Applicant Initiated Interview Summary (PTOL-413), dated Jul. 1, 2014, 3 Pages.
U.S. Appl. No. 13/030,084: Request for Continued Examination, dated Aug. 15, 2014, 26 Pages.
U.S. Appl. No. 13/030,084: Non-Final Rejection and Examiner's Search, dated Mar. 24, 2015, 24 pages.
U.S. Appl. No. 13/030,084: Amendment/Req. Reconsideration After Non-Final Rejection, filed Jun. 24, 2015, 28 pages.
U.S. Appl. No. 13/030,084: Terminal Disclaimer filed and Approved, Sep. 10, 2015, 3 pages.
U.S. Appl. No. 13/030,084: Notice of Allowance and Fees, dated Sep. 17, 2015, 24 pages.
U.S. Appl. No. 13/030,084: Issue Fee Payment and Amendment, dated Dec. 10, 2015 4 pages.
U.S. Appl. No. 14/968,429: Application as filed Dec. 14, 2015.
U.S. Appl. No. 14/968,429: Filing Receipt, dated Jan. 4, 2016, 3 pages.
U.S. Appl. No. 14/968,429: Applicant Response to Pre-Exam Formalities Notice, dated Jan. 14, 2016, 35 pages.
U.S. Appl. No. 14/968,429: Filing Receipt, dated Jan. 21, 2016, 3 pages.
U.S. Appl. No. 14/968,429: Notice of Publication, dated Apr. 28, 2016, 1 page.
U.S. Appl. No. 14/480,094: Application filed Jun. 29, 2006, 125 pages.
U.S. Appl. No. 14/480,094: Notice to File Corrected Application Papers dated Aug. 2, 2006, 2 pages.
U.S. Appl. No. 14/480,094: Response to Notice to File Corrected Application Papers filed Nov. 2, 2006, 32 pages.
U.S. Appl. No. 14/480,094: Filing Receipt dated Dec. 7, 2006, 3 pages.
U.S. Appl. No. 14/480,094: Non-final Office Action dated Nov. 7, 2008, 28 pages.
U.S. Appl. No. 14/480,094: Amendment filed May 7, 2009, 37 pages.
U.S. Appl. No. 14/480,094: Final Office Action dated Jul. 28, 2009, 16 pages.
U.S. Appl. No. 14/480,094: RCE with Amendment filed Dec. 28, 2009, 39 pages.
U.S. Appl. No. 14/480,094: Office Action dated Dec. 15, 2010, 15 pages.
U.S. Appl. No. 14/480,094: Office Action response, dated May 16, 2011, 29 pages.
U.S. Appl. No. 14/480,094: Final Office Action, dated Aug. 1, 2011, 13 pages.
U.S. Appl. No. 14/480,094: Amendment after final dated Nov. 1, 2011, 32 pages.
U.S. Appl. No. 14/480,094: Advisory Action dated Nov. 14, 2011, 3 pages.
U.S. Appl. No. 14/480,094: Notice of Appeal dated Nov. 28, 2011, 1 page.
U.S. Appl. No. 14/480,094: Abandonment, dated Jul. 31, 2012, 2 pages.
U.S. Appl. No. 14/870,744: Non-Final Rejection, dated Aug. 24, 2017, 11 pages.
U.S. Appl. No. 12/573,829: Advisory Action/After Final Consideration Program Decision, dated Aug. 29, 2017, 5 pages.
U.S. Appl. No. 12/573,829: RCE and Amendments, dated Sep. 5, 2017, 24 pages.

(56) References Cited

OTHER PUBLICATIONS

U.S. Appl. No. 15/250,118: Amendment/Req. Reconsideration—After Non-Final Reject, dated Sep. 14, 2017, 44 pages.
U.S. Appl. No. 12/830,236: Amendment/Req. Reconsideration—After Non-Final Reject, dated Oct. 23, 2017, 18 pages.
U.S. Appl. No. 14/641,735: Letter Restarting Period for Response, dated Aug. 24, 2017, 22 pages.
U.S. Appl. No. 15/240,964: Final Rejection, dated Aug. 9, 2017, 25 pages.
U.S. Appl. No. 15/240,964: After Final Consideration Program Request, dated Oct. 10, 2017, 30 pages.
U.S. Appl. No. 15/240,964: Advisory Action, dated Oct. 30, 2017, 3 pages.
U.S. Appl. No. 14/596,154: Non-Final Rejection, dated Sep. 21, 2017, 19 pages.
U.S. Appl. No. 14/968,429: Amendment/Req. Reconsideration—After Non-Final Reject, dated Aug. 9, 2017, 19 pages.
U.S. Appl. No. 14/968,429: Final Rejection, dated Oct. 24, 2017, 10 pages.

* cited by examiner

| Index | Binary Edge-Labelled Strings | Binary Edge-Labelled Trees |
|---|---|---|
| 0. | $\lambda$ [1] | 0 |
| 1. | < > | 1 |
| 2. | < 0 > | $\#_0 1 1$ |
| 3. | < 1 > | $\#_1 1 1$ |
| 4. | < 0, 0 > | $\#_0 1 \#_0 1 1$ |
| 5. | < 0, 1 > | $\#_0 \#_0 1 1 1$ |
| 6. | < 1, 0 > | $\#_1 1 \#_0 1 1$ |
| 7. | < 1, 1 > | $\#_1 \#_0 1 1 1$ |
| 8. | < 0, 0, 0 > | $\#_0 1 \#_0 1 \#_0 1 1$ |
| 9. | < 0, 0, 1 > | $\#_1 1 \#_1 1 1$ |
| 10. | < 0, 1, 0 > | $\#_0 \#_0 1 1 \#_0 1 1$ |
| 11. | < 0, 1, 1 > | $\#_0 \#_1 1 1 1$ |
| 12. | < 1, 0, 0 > | $\#_1 1 \#_0 1 \#_0 1 1$ |
| 13. | < 1, 0, 1 > | $\#_1 \#_1 1 1 1$ |
| 14. | < 1, 1, 0 > | $\#_1 \#_0 1 1 1 \#_0 1 1$ |
| 15. | < 1, 1, 1 > | $\#_0 \#_0 1 1 \#_1 1 1$ |

[1] The Greek lower-case symbol lambda denotes the empty string.

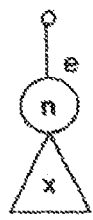
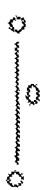
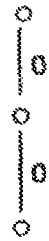
Fig. 9  Fig. 10a  Fig. 10b  Fig. 11a  Fig. 11b
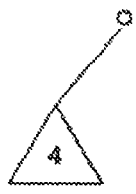
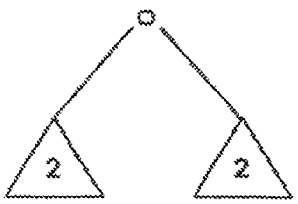
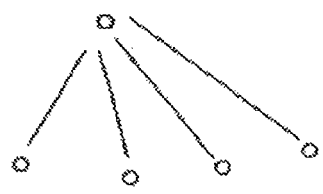
Fig. 12  Fig. 13  Fig. 14
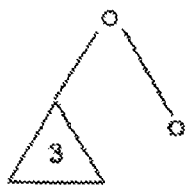
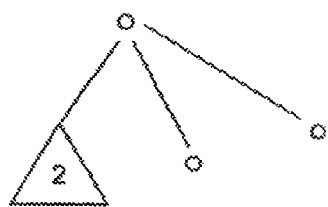
Fig. 15  Fig. 16

ENUMERATION OF TREES FROM FINITE NUMBER OF NODES

RELATED APPLICATION

This disclosure claims priority pursuant to 35 USC 119(e) from U.S. Provisional Patent Application Ser. No. 60/632,203, filed on Nov. 30, 2004, by Schiffmann, et al., titled, "ENUMERATION OF TREES FROM FINITE NUMBER OF NODES," assigned to the assignee of the presently claimed subject matter.

BACKGROUND

This disclosure is related to hierarchical data arrangements and, more particularly, to manipulating such data arrangements.

In a variety of fields, data or a set of data, may be represented in a hierarchical fashion. This form of representation may, for example, convey information, such as particular relationships between particular pieces of data and the like. However, manipulating such data representations is not straight-forward, particularly where the data is arranged in a complex hierarchy. Without loss of generality, one example may include a relational database. Techniques for performing operations on such a database, for example, are computationally complex or otherwise cumbersome. A continuing need, therefore, exists for additional techniques for manipulating data hierarchies.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference of the following detailed description when read with the accompanying drawings in which:

FIG. 6 is a table illustrating one embodiment of a linear notation for representing a graphical depiction of a hierarchical set of data;

FIG. 9 is a schematic diagram illustrating a generalized representation of an embodiment of one or more subtrees according to an embodiment;

FIGS. 10a, 10b, 11a and 11b are schematic diagrams illustrating applications of one embodiment of a push operation according to an embodiment;

FIGS. 12 through 16 are schematic diagrams illustrating allocations of five nodes among subtree slots for trees having five nodes according to an embodiment;

DETAILED DESCRIPTION

Figure 1:
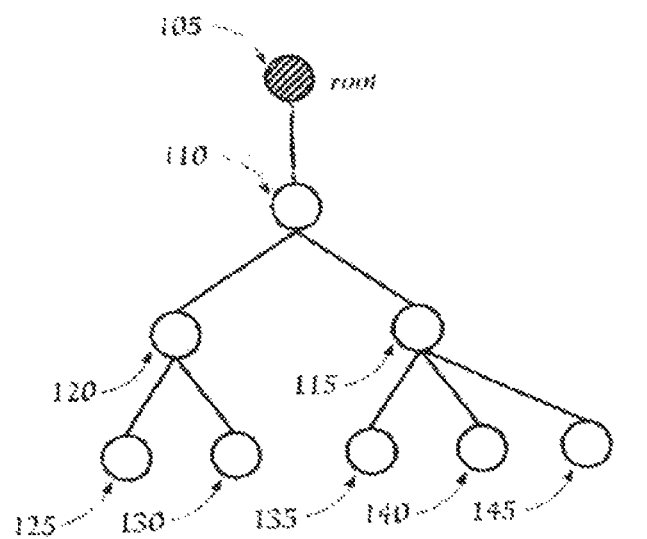
FIG. 1 is a schematic diagram of one embodiment of a tree.

In the following detailed description, numerous specific details are set forth to provide a thorough understanding of the claimed subject matter. However, it will be understood by those skilled in the art that the claimed subject matter may be practiced without these specific details. In other instances, well-known methods, procedures, components and/or circuits have not been described in detail so as not to obscure the claimed subject matter.

Some portions of the detailed description which follow are presented in terms of algorithms and/or symbolic representations of operations on data bits or binary digital signals stored within a computing system memory, such as a computer memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing involve physical manipulations of physical quantities. Typically, although not necessarily, these quantities may take the form of electrical and/or magnetic signals capable of being stored, transferred, combined, compared and/or otherwise manipulated. It has proven convenient at times, principally for reasons of common usage, to refer to these signals as bits, data, values, elements, symbols, characters, terms, numbers, numerals and/or the like. It should be understood, however, that all of these and similar terms are to be associated with the appropriate physical quantities and are merely convenient labels. Unless specifically stated otherwise, as apparent from the following discussion, it is appreciated that throughout this specification discussions utilizing terms such as "processing", "computing", "calculating", "determining" and/or the like refer to the actions and/or processes of a computing platform, such as a computer or a similar electronic computing device, that manipulates and/or transforms data represented as physical electronic and/or magnetic quantities within the computing platform's memories, registers, and/or other information storage, transmission, and/or display devices.

In a variety of fields, data or sets of data may be represented in a hierarchical fashion. This form of representation may, for example, convey information, such as particular relationships between particular pieces of data and the like. However, manipulating such data representations is not straight forward, particularly where the data is arranged in a complex hierarchy. Without loss of generality, one example may include a relational data base. Techniques for performing operations on such a data base for example, may be computationally complex or otherwise cumbersome. A continuing need, therefore, exists for additional techniques for manipulating data hierarchies.

As previously discussed, in a variety of fields, it is convenient or desirable to represent data, a set of data and/or other information in a hierarchical fashion. In this context, such a hierarchy of data shall be referred to as a "tree." In a particular embodiment, a tree may comprise a finite, rooted, connected, unordered, acyclic graph. This is illustrated here, for example, in FIG. 1 by embodiment 100. As illustrated, the root of this particular embodiment encompasses node 105. In addition to 105, there are eight other nodes designated 110 to 140, respectively. Likewise, the nodes are connected by branches referred to, in this context, as edges. Thus, the nodes of this tree are connected by eight edges. This embodiment, therefore, illustrates a finite tree that is rooted by node 105. Furthermore, the nodes are connected, meaning, in this context, that a path exists between any two nodes of the tree. The tree is likewise acyclic, meaning here, that no path in the tree forms a complete loop. Here, unordered refers to the notion that there is no implied ordering or precedence among nodes attached to a common node, despite the appearance of ordering in a graphical illustration.

As previously suggested, in a variety of contexts, it may be convenient and/or desirable to represent a hierarchy of data and/or other information using a structure, such as the embodiment illustrated in FIG. 1. One particular embodiment, without loss of generality, of a tree may include edges that are labeled with data and/or other values. Likewise, in one particular embodiment, such data or values may be limited to binary data, that is, in this example, either a binary one or a binary zero. Here, such an embodiment may be referred to as a binary edge labeled tree (BELT), as shall be discussed in more detail hereinafter.

Figure 2:
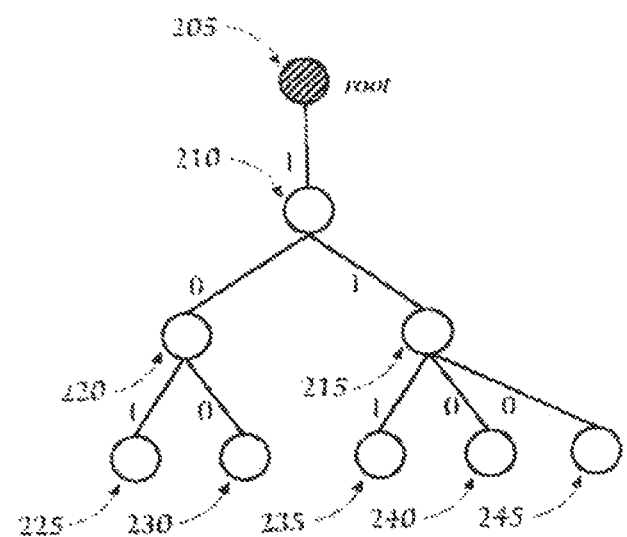
FIG. 2 is a schematic diagram illustrating one embodiment of a binary edge labeled tree (BELT)
Figure 3:
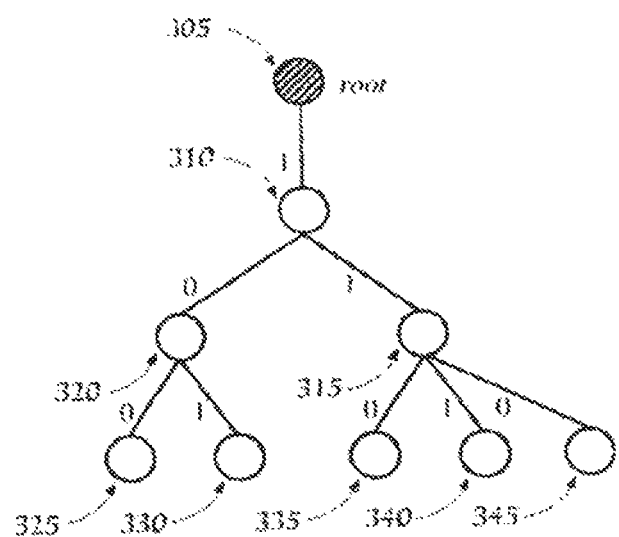
FIG. 3 is a schematic diagram illustrating another embodiment of a BELT.

One example of a BELT is illustrated by embodiment 200 of FIG. 2. Thus, as illustrated, the edges of the BELT shown in FIG. 2 are labeled with either a binary zero or binary one. FIG. 3 illustrates another embodiment 300 of a different binary edge labeled tree. It is noted that this tree is similar to the embodiment of FIG. 2. Without belaboring the present discussion, additional descriptions of how BELTs may represent a hierarchy of data may be found in U.S. Provisional Patent Application No. 60/543,371, filed on Feb. 9, 2004, by J. J. LeTourneau, titled, "Manipulating Sets of Hierarchical Data," assigned to the assignee of the presently claimed subject matter with reference to FIGS. 4-7 therein.

Figure 4:
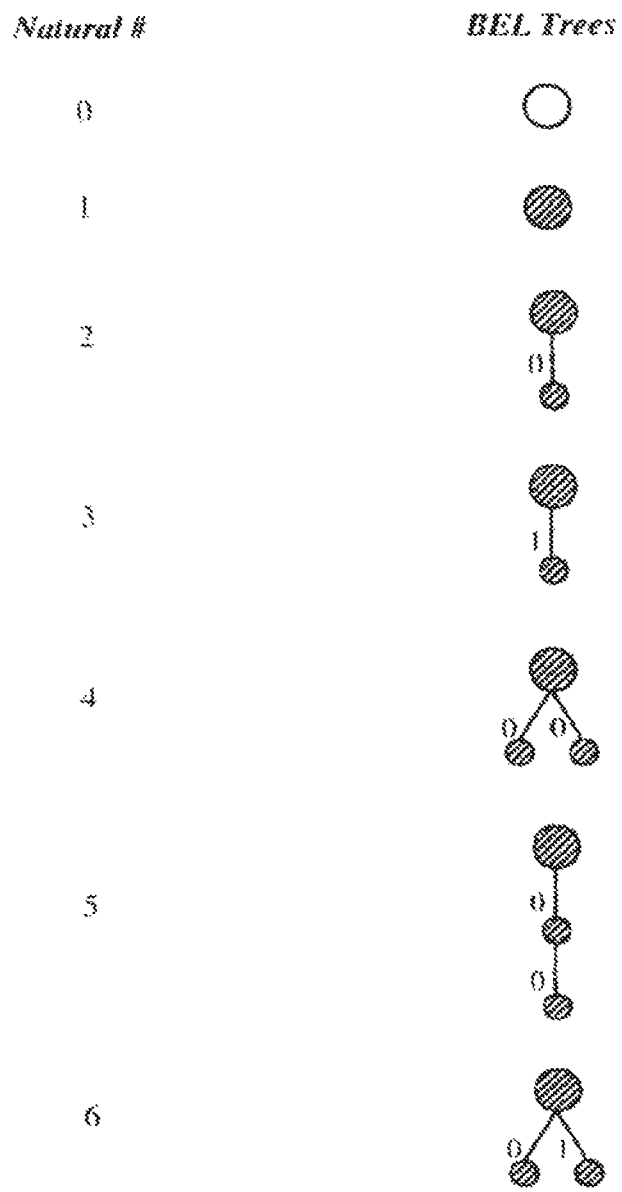
FIG. 4 is a table illustrating a particular embodiment of an association between natural numerals and BELTs.

Binary edge labeled trees may also be enumerated. Thus, for this particular embodiment, although the claimed subject matter is not limited in scope in this respect, a method of enumerating a set of trees begins with enumeration of an empty binary edge labeled tree and a one node binary edge labeled tree. Here, the empty tree is associated with the zero and has a symbolic representation as illustrated in FIG. 4 (circle). Likewise, the one node tree, which holds no data, is associated with the one and has a graphical representation of a single node. For higher positive natural numerals, however, this embodiment of a method of enumerating a set of trees comprises positioning a tree at location k, k being a positive greater than three, where k is the product of u and v, u and v comprising positive s greater than one, such that the tree is formed by a union of the trees at positions u and v. Likewise, for those locations that are not a product of other natural positive numerals greater than one, that is, for locations that comprise non-composite numerals, denoted here by j, for example, j being a positive natural numeral greater than one, a tree is positioned at location j such that the tree is formed by finding the first tree in the prior enumeration such that the binary edge labeled tree obtainable from this first tree by attaching a node to the particular tree as a new root node and labeling the edge between the new root node and the prior root node with a binary "0" label is not in the enumeration at some position lower than j; however, if the binary edge labeled tree obtainable from that first tree, as just described, is present in the enumeration with a binary "0" label for the new edge, but not with a binary "1" label, then the tree at position j is that tree with a binary "1" label for the new edge. This may be illustrated, for example, in FIG. 4, as described in more detail below.

However, for this particular embodiment, although the claimed subject matter is not limited in scope in this respect, a method of enumerating a set of ordered trees may begin with enumeration of an empty binary edge labeled tree and a one node binary edge labeled tree. Thus, the empty tree is associated with the zero and has a symbolic representation as illustrated in FIG. 4 (circle). Likewise, the one node tree, which holds no data, is associated with the one and has a graphical representation of a single node. For higher positive natural numerals, ordered trees may be generated by a process described, for example, in "The Lexicographic Generation of Ordered Trees," by S. Zaks, The Journal of Theoretical Computer Science, Vol. 10(1), pp. 63-82, 1980, or "Enumerating Ordered Trees Lexicographically," by M. C. Er, Computation Journal, Vol. 28, Issue 5, pp. 538-542, 1985.

As illustrated, for this particular embodiment, and as previously described, the empty tree has zero nodes and is associated with the zero. Likewise, the one node tree root comprises a single node and is associated with the one. Thus, to obtain the tree at position two, a root node is attached and connected to the prior root node by an edge. Likewise, here, by convention, the edge is labeled with a binary zero. If, however, the tree formed by the immediately proceeding approach were present in the prior enumeration of trees, then a similar process embodiment is followed, but, instead, the new edge is labeled with a binary one rather than a binary zero. Thus, for example, in order to obtain the binary edge labeled tree for position three, a new root node is connected to the root node by an edge and that edge is labeled with a binary one.

Continuing with this example, to obtain the binary edge labeled tree for position four, observe that numeral four is the product of numeral two times numeral two. Thus, a union is formed at the root of two trees, where, here, each of those trees is associated with the positive natural numeral two. Likewise, to obtain the binary edge labeled tree for position five, begin with the binary edge labeled tree for position two and follow the previously articulated approach of adding a root and an edge and labeling it with a binary zero.

In this context, adding a root node and an edge and labeling it binary zero is referred to as a "zero-push" operation and adding a root node and an edge and labeling it binary one is referred to as a "one-push" operation. Based at least in part on the prior description, for this particular embodiment, it may now be demonstrated that if k is any positive natural numeral and a tree x is positioned at location k, then a non-composite numeral is associated with the zero-push of that tree and a non-composite numeral is associated with the one-push for that tree. Furthermore, the non-composite index of the zero-push of the tree comprises 2k−1, whereas the non-composite index of the one-push of the tree comprises 2k, where the index corresponds to the argument of the well-known Kleene enumeration on positive natural numerals of non-composite numerals, as illustrated, for example, in part in FIG. 5. Thus, referring again to FIG. 4, the one-push of the root tree is the tree at position three.

Figure 5:
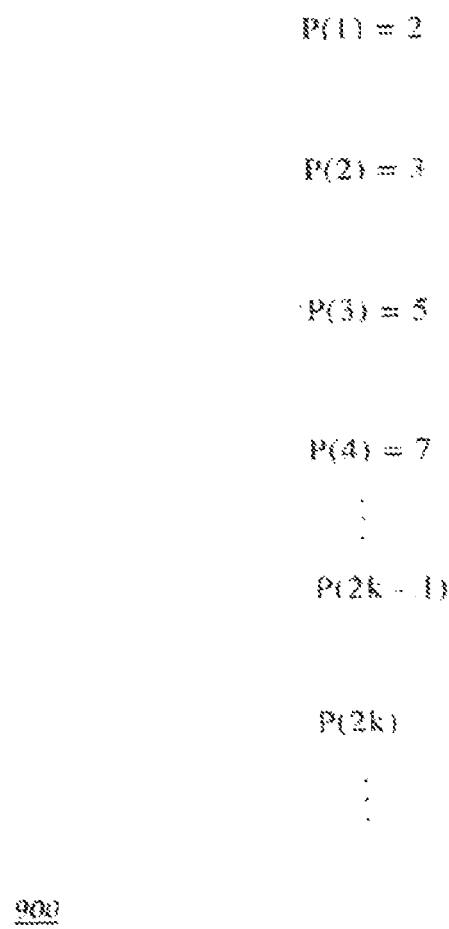
FIG. 5 is a table illustrating a portion of the Kleene enumeration of non-composite numerals.

This follows from FIG. 5 since P(2*1)=P(2)=3. Likewise, the tree at position five is the zero-push of the tree at position 2. Again, this follows from FIG. 5 since P(2*2−1)=P(3)=5.

In this context, the approach just described may be referred to as vectorizing non-composite numerals. In the embodiment just described, this was accomplished in pairs, although, of course, the claimed subject matter is not limited in scope in this respect. This may be accomplished in any number of numeral combinations, such as triplets, quadruplets, etc. Thus, using a quadruplet example, it is possible to construct trees such that if k is any positive natural numeral and a tree x is positioned at location k, then a non-composite numeral is associated with the zero-push of that tree, a non-composite numeral is associated with the one-push for that tree, a non-composite numeral is associated with the two-push for that tree, and a non-composite number is associated with the three-push for that tree. Furthermore, the index of the non-composite numeral is such that for a zero-push of the tree, the index comprises (4k−3), for a one-push of a tree, the index comprises (4k−2), for a two-push of a tree, the index comprises (4k−1), and for a three-push of a tree the index comprise (4k), where the index corresponds to the Kleene enumeration of non-composite numerals, P(index), such as provided in FIG. 5.

In the previously described enumeration of binary edged labeled trees, a mechanism may be employed to reduce or convert complex manipulations of hierarchical data to multiplication of natural numerals. For example, if it is desired to combine, or merge at their roots, two trees of hierarchical data, a complex task both computationally and graphically, instead, for this particular embodiment, the two trees may be converted to numerical data by using the previously described association embodiment between binary edge labeled trees and natural numerals. The resulting numerical data from the prior conversion may then be multiplied, and the resulting product may then be converted to a binary edge labeled tree by using a table look up of the previously described association embodiment. It is noted that a subtle distinction may be made between an enumeration embodiment and an association embodiment. Enumeration may comprise listing, in this example, a particular ordered embodiment of BELTs, whereas an association provides a relationship between, in this example, a particular ordered embodiment of BELTs and natural numerals. It is, of course, appreciated that many different enumeration and association embodiments may be employed to execute the operations discussed above and hereinafter, and the claimed subject matter is intended to cover all such enumeration and association embodiments.

Likewise, a process embodiment that is a reversal to the previously described embodiments may also be employed. Thus, complex hierarchies of data may be split or divided, when this is desired. For example, a binary edge labeled tree to be divided may be converted to a piece of numerical data, such as by using the previously described association embodiment. This data may then be factored into two pieces of numerical data whose product produces the previously mentioned piece of numerical data. These two pieces of numerical data may then be converted to trees, again, by using the prior association embodiment, for example.

Another form of manipulating hierarchical sets of data may involve ordering or hashing. This may be desirable for any one of a number of different operations to be performed on the sets of data. One approach is similar to the previously described embodiment. For example, it may be desired to order a given set of trees. Doing so may involve converting the trees to numerical data, as previously described, using an association embodiment. The numerical data may then be ordered and the numerical data may then be converted back to binary edge labeled trees using the previously described association embodiment, or an alternate association embodiment, for example.

It is noted that there may be any one of a number of different ways of converting from numerals or numerical data values to a binary edge labeled tree or from a binary string to a binary edge labeled tree, and vice-versa. Nonetheless, a convenient method for doing so with this particular embodiment includes storing a table providing an association embodiment between natural numerals, binary strings and binary edge labeled trees, such as the embodiment previously described. Thus, once it is desired to convert from one to the other, such as from a binary string to a BELT, from a natural numeral to a BELT, or vice-versa, for example, a table look up operation may be performed using the association embodiment.

Techniques for performing table look ups are well-known and well-understood. Thus, this will not be discussed in detail here. However, it shall be appreciated that any and all of the previously described and/or later described processing, operations, conversions, transformations, manipulations, etc. of strings, trees, numerals, data, etc. may be performed on one or more computing platforms or similar computing devices, such as those that may include a memory to store a table as just described, although, the claimed subject matter is not necessarily limited in scope to this particular approach. Thus, for example, a hierarchy of data may be formed by combining two or more hierarchies of data, such as by applying a previously described embodiment. Likewise, multiple hierarchies of data may be formed by splitting or dividing a particular hierarchy of data, again, such as by applying a previously described embodiment. Likewise, additional operations and/or manipulations of data hierarchies may be performed, such as ordering hierarchies of data and more. It is intended that the claimed subject matter cover such embodiments.

Much of the prior discussion was provided in the context of binary edge labeled trees. Nonetheless, as alluded to previously, binary edge labeled trees and binary node labeled trees may be employed nearly interchangeably to represent substantially the same hierarchy of data. In particular, a binary node labeled tree may be associated with a binary edge labeled tree where the nodes of the binary node labeled tree take the same values as the edges of the binary edge labeled tree, except that the root node of the binary node labeled tree may comprise a node having a zero value or a null value. Thus, rather than employing binary edge labeled trees, the previously described embodiments may alternatively be performed using binary node labeled trees. As one example embodiment, operations and/or manipulations may be employed using binary edge labeled trees and then the resulting binary edge labeled tree may be converted to a binary node labeled tree. However, in another embodiment, operations and/or manipulations may be performed directly using binary node labeled trees where a different association embodiment, that is, in this example, one that employs binary node labeled trees, is employed.

In accordance with the claimed subject matter, therefore, any tree, regardless of whether it is binary edge labeled, binary node labeled, non-binary, a feature tree, or otherwise, may be manipulated and/or operated upon in a manner similar to the approach of the previously described embodiments. Typically, different association embodiments shall be employed, depending at least in part, for example, upon the particular type of tree. For example, and as shall be described in more detail below in connection with FIG. 7, a node labeled tree in which the nodes are labeled with natural numerals or data values may be converted to a binary edge labeled tree. Furthermore, this may be accomplished with approximately the same amount of storage. For example, for this particular embodiment, this may involve substantially the same amount of node and/or edge data label values.

Figure 7:
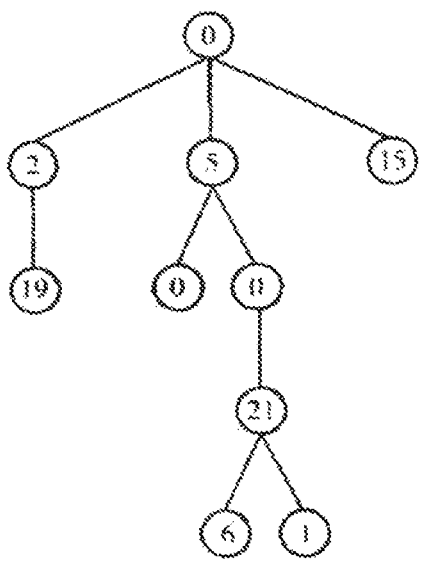
FIG. 7 is a schematic diagram of an embodiment of a node labeled tree.
Figure 8:
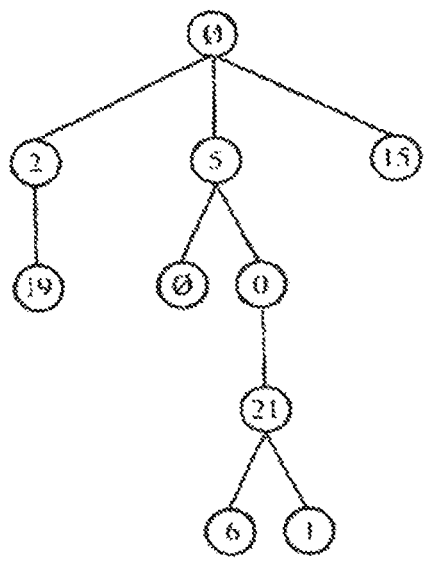
FIG. 8 is a schematic diagram illustrating another embodiment of a node labeled tree.

As previously noted, the claimed subject matter is not limited in scope to this particular example, however, as illustrated in more detail hereinafter, the tree illustrated in FIG. 7 is converted to a binary edge labeled tree through a sequence of processing depicted here as graph operations, although such a conversion may alternatively be implemented by operations implemented otherwise, one such example being a computing platform, for example. Alternatively, it may be desirable, depending upon the particular embodiment, to convert trees to, for example binary node labeled trees. Likewise, other embodiments in which trees of one form are converted to trees of another form are also included within the scope of the claimed subject. However, for this particular embodiment, it will be assumed that the association between trees and numerals, such as previously described, is depicted or enumerated in terms of binary edge labeled trees, as previously illustrated, for example. Thus, in this example, a particular tree, embodiment 1100, is illustrated in FIG. 7, comprises a node labeled tree rather than an edge labeled tree. Without belaboring the present discussion, a process of converting a node labeled tree such as that illustrated in FIG. 7 to a BELT may be found in U.S. Provisional Patent Application No. 60/543,371, filed on Feb. 9, 2004, by J. J. LeToumeau, titled, "Manipulating Sets of Hierarchical Data," assigned to the assignee of the presently claimed subject matter with reference to FIGS. 11-16 therein.

In another embodiment, however, a particular tree may include null types or, more particularly, some node values denoted by the empty set. This is illustrated, for example, by the tree in FIG. 13, although, of course, this is simply one example. An advantage of employing null types includes the ability to address a broader array of hierarchical data sets. For example, without loss of generality and not intending to limit the scope of the claimed subject matter in any way, a null type permits representing in a relational database, as one example, situations where a particular attribute does not exist. As may be appreciated, this is different from a situation, for example, where a particular attribute may take on a numeral value of zero. Thus, it may be desirable to be able to address both situations when representing, operating upon and/or manipulating hierarchical sets of data. A tree with nulls may be converted to a tree without nulls as described in U.S. Provisional Patent Application No. 60/543,371, filed on Feb. 9, 2004, by J. J. LeToumeau, titled, "Manipulating Sets of Hierarchical Data," assigned to the assignee of the presently claimed subject matter with reference to FIGS. 17-22 therein.

Likewise, in an alternative embodiment, a node labeled tree may comprise fixed length tuples of numerals. For such an embodiment, such multiple numerals may be combined into a single numeral, such as by employing Cantor pairing operations, for example. See, for example, *Logical Number Theory, An Introduction*, by Craig Smorynski, pp. 14-23, available from Springer-Verlag, 1991. This approach should produce a tree to which the previously described embodiments may then be applied. Furthermore, for one embodiment, a tree in which nodes are labeled with numerals or numerical data, rather than binary data, may be converted to a binary edge labeled tree and/or binary node labeled tree, and, for another embodiment, a tree in which edges are labeled with numerals or numerical data, rather than binary data, may be converted to a binary edge labeled tree and/or binary node labeled tree.

Furthermore, a tree in which both the nodes and the edges are labeled may be referred to in this context as a feature tree and may be converted to a binary edge labeled tree and/or binary node labeled tree. For example, without intending to limit the scope of the claimed subject matter, in one approach, a feature tree may be converted by converting any labeled node with its labeled outgoing edge to an ordered pair of labels for the particular node. Using the embodiment described above, this tree may then be converted to a binary edge labeled tree.

In yet another embodiment, for trees in which data labels do not comprise simply natural numerals, such as, as one example, trees that include negative numerals, such data labels may be converted to an ordered pair of numerals. For example, the first numeral may represent a data type. Examples include a data type such as negative, dollars, etc. As described above, such trees may also be converted to binary edge labeled trees, such as by applying the previously described embodiment, for example.

As previously described, trees may be employed to graphically represent a hierarchy of data or a hierarchy of a set of data. This has been illustrated in some detail for binary edge labeled trees, for example. As the previous figures, illustrate, however, such graphical hierarchical representations typically employ two spatial dimensions to depict the relationship among different pieces of data. This may be disadvantageous in some situations where a one dimensional representation or arrangement of symbols, such as is employed with alphabetic letters, for example, that are combined to create a linear collection of successive symbols or notations, such as words, would be more convenient.

FIG. 6 is a table that illustrates one particular embodiment of employing symbols, concatenated along one spatial dimension, here from left to right, by convention, to represent such a data hierarchy. The table includes four columns. The first column denotes natural numerals. The second column denotes binary strings. The third column denotes a one dimensional arrangement of symbols employed to represent the binary edge labeled trees for that particular position. Of course, as previously described in connection with prior embodiments, the claimed subject matter is not limited in scope to binary strings or binary edge labeled trees. Thus, in alternative embodiments, any tree may be represented with symbols organized in a one dimensional arrangement, as is demonstrated with this particular embodiment.

According to an embodiment, a finite number of trees may be enumerated from a finite number of nodes. For each tree enumerated from the finite number of nodes, a natural numeral may be associated with the enumerated tree based, at least in part, on an association between trees and natural numerals. For example, a set of fully configured, unordered trees may be enumerated from a finite number of nodes. The enumerated trees may then be represented by a corresponding set of natural numerals.

For this particular embodiment, a tree may be expressed as one or more "subtrees" coupled at the root node of the tree. A subtree is coupled to the root node of the tree by an edge and independently has properties of a tree, except that the subtree is part of a larger tree. For example, here, a subtree comprises at least a "root" node coupled by an edge to a root node of the tree. Additional nodes and edges may be coupled to the root node of the subtree. While a subtree may be coupled to a root node of a tree by an edge, the size and shape of the subtree may express information like that of a tree having the same size and shape as the subtree. The subtrees coupled together at the root node of a tree may be referred to as "subtree children" of the root node where a subtree may be referred to as a "subtree child" of the tree in this embodiment.

FIG. 9 is a schematic diagram illustrating a representation an embodiment of one or more subtrees connected via an edge having a label "e" with a subtree root node having a label "n." A value associated with the one or more subtrees may be represented by "x" which may represent information expressed as a natural numeral as illustrated above with reference to FIG. 4. However, this is merely an example of a representation of a subtree and the claimed subject matter is not limited in this respect. Accordingly, the value of the tree shown in FIG. 9 may be expressed as a push of the subtree having the value x. A push operation on the subtree may be represented in relation (1) as follows:

$$<j,k>\text{-push}(x)=P[kx+j-k+(2-r)], \text{ if } j<k \text{ and } k>0 \qquad (1)$$

where:
P(m)=Kleene enumeration function for generating a sequence of non-composite numbers illustrated with reference to FIG. 5;
k=total number of values possible for a label;
j=actual computed label index value;
x=value of "pushed" subtree with edge "e" and root label "n";
r=defined value of tree system root/singleton node (either 0 or 1).

It should be noted that "j" is a function of the specific values of "e" (the specific edge label) and "n" (the specific node label). It should be understood that while the push operation of relation (1) is suitable for performing specific embodiments described herein, this push operation is merely an example of how a push operation may be performed on a subtree and the claimed subject matter is not limited in this respect.

In addition to applying the push operation to a single tree or subtree having a value x, the push operation may be applied to multiple tree or subtree elements of a set in relation (2) as follows:

$$<j,k>\text{-push}[\{a,b,c\}]=\{<j,k>\text{-push}(a)\}\cup\{<j,k>\text{-push}(b)\}\cup\{<j,k>\text{-push}(c)\} \qquad (2)$$

where a, b and c are numerical representations of tree or subtree elements in the pushed set. The result of the operation of relation (2) may be referred to as a "pushed set" of tree or subtree elements.

FIGS. 10*a*, 10*b*, 11*a* and 11*b* illustrate applications of the push operation of relation (1) to specific subtrees. FIG. 10*a* shows a BELT having a value of "2". As such, x=2, k=2 and r=1. FIG. 10*b* illustrates the result of a push of the tree in FIG. 10*a* by an edge having a label zero (i.e., a zero-push). The value of j for this push operation is zero. Accordingly, the push operation provides a numeral associated with the pushed BELT as follows:

$$<j,k>\text{-push}(x)=P[2*2+0-2+2-1]=P[3]=5.$$

FIG. 11*a* shows a structure-only tree (i.e., a tree with unlabeled elements) with two nodes having a value of x=2. As such, k=1 (since there are no labels) and r=1. FIG. 11*b* illustrates the result of a push of the tree in FIG. 11*a* by an unlabeled edge. The value of j is zero since there are no labels. Accordingly, the push operation determines a numeral associated with the pushed unlabeled tree as follows:

$$<j,k>\text{-push}(x)=P[1*2+0-1+2-1]=P[2]=3.$$

A number of subtrees coupled to a root node of a tree may be configured from one or more "subtree slots." In this embodiment, a subtree slot represents a possible location of a subtree coupled to the root node of a larger tree. For a tree enumerated from a finite number N of nodes, a first node may serve as a root node while the remaining N−1 nodes may be configured into subtrees coupled to the root node. Up to N−1 subtrees may be formed from the remaining N−1 nodes (where each subtree contains a single node coupled to the root node by an edge). Accordingly, N−1 subtree slots may be identified for the set of trees enumerated from N nodes.

For any particular enumerated tree, according to an embodiment, an "arrangement of subtree slots" sets forth an unordered set of subtree slots having a subtree of at least one node. In enumerating a tree from N nodes, for example, one arrangement of subtree slots having a subtree in each of N−1 subtree slots yields a tree having a single node in each of N−1 subtree slots coupled to the root node by an edge. In another arrangement of subtree slots for a tree enumerated from N nodes, for example, a single subtree slot may contain all N−1 nodes. However, these are merely examples of arrangements of subtree slots and that other arrangements may be possible.

A subtree slot in an arrangement of subtree slots may have one or more nodes according to one or more "allocations of nodes" among the subtree slots defining a number of nodes in the subtree slot of the arrangement. In other words, such an allocation of nodes for an arrangement of subtree slots (i.e., the number of subtree slots having at least one node) sets forth the number nodes being allocated to each subtree slot. The nodes allocated to a subtree slot (e.g., according to an allocation of nodes among subtrees) may be set out in one or more possible, unordered configurations of a subtree where a possible configuration may represent a set of data and/or other information in a hierarchy of data using properties of a tree. In a particular embodiment, a configuration of a subtree may comprise a finite, rooted, connected, unordered acyclic graph as illustrated with reference to FIGS. 1-8.

According to an embodiment, a finite number of possible trees or subtrees may be enumerated from a finite number of N nodes. For any tree (or subtree) with N such nodes, there are N−1 available arrangements of subtree children. That is, for a tree (or subtree) with N nodes there may be any arrangement of zero to N−1 subtree children coupled to a root node. Accordingly, an arrangement of subtree children may define up to N−1 subtree slots that may be coupled or merged at a root node of the tree. For any particular arrangement of subtree children (e.g., represented as a count of the number of subtree slots with at least one node coupled to a root node) an allocation of nodes may be expressed as an unordered set containing N−1 elements where an element of the unordered set defines 0 to N−1 nodes for a corresponding subtree slot. An element of the unordered set may represent a count (ranging from 0 to N−1) of a number of nodes being allocated to the corresponding subtree slot. The sum of the counts represented by the elements may then equal N−1.

For any particular allocation of nodes among one or more subtree slots in an arrangement of subtree slots, there may be one or more possible "fully configured trees" defining a relationship among the allocated nodes using each of the allocated nodes. Such a fully configured tree may represent hierarchical data in a finite, rooted, connected, unordered, acyclic graph. Similarly, for an allocation of nodes to a subtree slot, the fully configured tree may comprise a corresponding subtree child representing hierarchical data in a finite, rooted, connected, unordered, acyclic graph. Notation "{FTs: N}" provides a shorthand notation for this particular embodiment to indicate the set of all fully configured trees that may possibly be configured from exactly N nodes under a given set of conditions (e.g., parameters characterizing the type of tree such as k, j, and r as described above in connection with the push operation of relation (1)) Of course, this is merely an example of how a set of fully configured trees from exactly N nodes may be characterized and the claimed subject matter is not limited to this particular approach.

However, continuing with this example, as illustrated in FIGS. 12 through 16, for example, a tree with five nodes may have one to four subtrees where each subtree includes at least one of the five nodes. FIG. 12 shows a single subtree with four nodes, FIGS. 13 and 15 two subtrees, FIG. 16 shows three subtrees and FIG. 14 shows four subtrees.

For any particular arrangement of subtrees with a finite number of nodes, the arrangement may be characterized as having one or more possible allocations of the nodes among the subtrees in the arrangement. Table 1 below illustrates five allocations of five nodes among subtrees among arrangements of one to four subtree slots.

TABLE 1

Allocation of Nodes ($A_i$) Among Subtree Slots

| Allocation Number (i) | Subtree Slots (m) | | | |
|---|---|---|---|---|
| | 0 | 1 | 2 | 3 |
| 0 | 4 | 0 | 0 | 0 |
| 1 | 3 | 1 | 0 | 0 |
| 2 | 2 | 2 | 0 | 0 |
| 3 | 2 | 1 | 1 | 0 |
| 4 | 1 | 1 | 1 | 1 |

For this embodiment, an allocation defines a set of unordered elements. Thus, it should be understood that the ordering of allocations of specific quantities of nodes to particular subtree slots (numbered 0 to 3) outlined in Table 1 is arbitrary and that there are other ways to sequence the allocation of nodes among subtree slots. For this particular example, allocation 0 indicates the allocation of four nodes to a single subtree slot 4. The allocation merely represents the allocation of four nodes to a single subtree slot, irrespective of the particularly numbered subtree slot. Accordingly, duplicate entries of four nodes being allocated to either of subtree slot 1, 2 or 3 are not represented in Table 1. Similarly, allocation 2 of this particular example indicates the allocation of two nodes to subtree slot 0 and two nodes to subtree slot 1. This allocation merely represents the allocation of two nodes to a first subtree slot and two nodes to a second, different, subtree slot. Accordingly, duplicate entries of two nodes being allocated to each of slots 2 and 3, among others, are not represented in Table 1.

According to one embodiment, a merger operation discussed above (for combining trees at their root nodes to provide a graphical and numerical expression of the resulting merged tree) may be expanded to create a set merger operation to include a merger among trees in different sets of trees. Here, a member tree of a first set merges with a member tree of a second set to provide a third, merged set containing the merged trees as elements, for all members of both sets. Regarding the representation of the trees as natural numerals, the set merger operation to merge sets X and Y may be expressed as follows:

$$X \times Y = \{x_1, x_2, x_3, \ldots, x_n\} \times \{y_1, y_2, y_3, \ldots, y_m\} == \quad (3)$$

$$\{x_1 * y_1, x_1 * y_2, x_1 * y_3, \ldots, x_1 * y_m\} \cup$$

$$\{x_2 * y_1, x_2 * y_2, x_2 * y_3, \ldots, x_1 * y_m\} \cup$$

$$\{x_3 * y_2, x_3 * y_2, x_3 * y_3, \ldots, x_3 * y_m\} \cup \ldots \cup$$

$$\{x_n * y_1, x_n * y_2, x_n * y_3, \ldots, x_n * y_m\}$$

where:
$x_1, x_2, x_3, \ldots x_n$ are the natural numerals representing trees in set X; and
$y_1, y_2, y_3, \ldots y_m$ are the natural numerals representing trees in set Y;

Using the set merger operation illustrated at relation (3), for this particular embodiment, the merger of sets {FTs: N} and {FTs: M}, representing all trees which may be enumerated from N and M nodes, respectively, provides a set of trees enumerating all trees formed by the merger of any tree in {FTs: N} with any tree in {FTs: M}.

Figure 17:
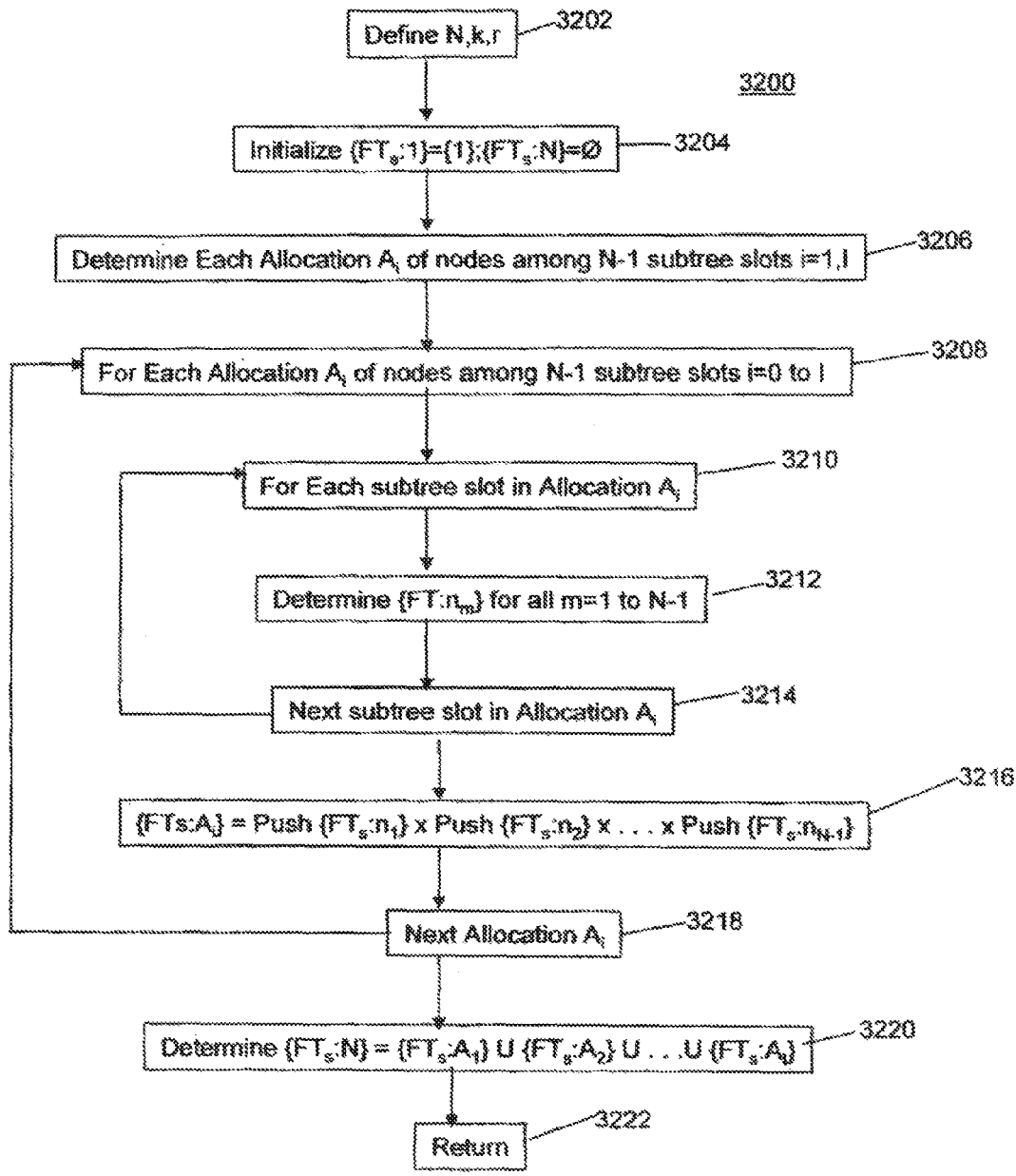
FIG. 17 is a flow diagram illustrating a process to enumerate all trees which are configurable from a finite number of nodes according to an embodiment.

FIG. 17 is a flow diagram illustrating an embodiment of a process 3200 for enumerating trees which may possibly be configured from an N number of nodes {FTs: N}(under a given set of conditions) and determining a corresponding unique natural numerals for representing the particular enumerated trees. The process 3200 may be implemented as a computer program or subroutine expressed as machine-readable instructions which are executable by a processor. However, the claimed subject matter is not limited in scope in this respect.

Block 3202 defines parameters indicating the size and type of trees that are to be enumerated. N determines the number of nodes in the enumerated trees. The parameters r and k determine the defined value of the enumerated tree system and total number of values possible for a label as indicated for the push operation of relation (1). Block 3204 initializes full tree set {FTs: 1}={1} to represent a natural numeral for a single root node. As discussed below, in this particular example, the enumerated trees are generated from applying a push operation of relation (1) to the single root node. It should be understood, however, that the single root node may be associated with a different natural numeral and the claimed subject matter is not limited in this respect. Block 3204 also initializes full tree set {FTs: N}=0 to indicate a set that initially contains no elements to which elements are to be added through the subsequent execution of blocks 3206 through 3220.

Block 3206 determines an allocation $A_i$ of nodes among up to N−1 subtree slots as illustrated in the example of Table 1 above. In the example of Table 1, allocation $A_i$ for i=0 to 4 represents an allocation of four nodes among up to four subtrees. For allocations $A_i$, a loop defined by blocks 3208 through 3218 determines a set containing trees that may be enumerated for the allocation $A_i$ (denoted as "{FTs: $A_i$}") and an associated natural numeral for the particular enumerated tree in {FTs: $A_i$}. A subtree slot m (where m=0 to N−1) in $A_i$ includes a number of nodes $n_m$ (from 0 to N−1). For a subtree slot in $A_i$, a loop defined by blocks 3210 through 3214 enumerates the set of all fully configured trees that may be configured from $n_m$ nodes {FTs: $n_m$}. Block 3212 may determine {FTs: $n_m$} by recursively executing the described process 3200 using the argument of $n_m$ as N in block 3202 of the recursively executed process 3200 (while maintaining the parameters k and r in block 3202 of the recursively executed process 3200).

Block 3216 determines the set {FTs: $A_i$} based, at least in part, upon the sets {FTs: $n_m$}, m=0 to N−1, determined in the loop of blocks 3210 through 3214. For a set {FTs: $n_m$}, block 3216 determines the push of this set according to the push operation of relation (2). As discussed above with reference to FIG. 9, a result of the push operation of relation (1) may depend on particular information associated with edge or node labels coupling the pushed subtree to a root node. In the case of a BELT, for example, the pushed subtree may be coupled to the root node by an edge labeled one or zero. Thus, in this particular example, to enumerate all trees resulting from a pushed binary edge labeled subtree, the push operation of relation (1) may be applied with j=0 (e.g., a zero-push) to enumerate a first resulting tree and with j=1 (e.g., a one-push) to enumerate a second resulting tree. Similarly, in the application of the push operation of relation (2) to a set of tree elements, the resulting enumerated pushed tree element may depend on particular information associated with edge or node labels coupling the pushed tree element to a root node. Thus, in this particular example, to enumerate all trees resulting from the application of push operation of relation (2) to a set of tree elements, block 3216 provides a union of j-push{FTs: $n_m$} sets for all possible values of j (e.g., for all j=0 to k). In the case of enumerating all BELTs from N nodes, for example, the operation "Push{FTs: $n_m$}" as shown in block 3216 refers to the union of zero-push{FTs: $n_m$} and one-push{FTs: $n_m$}. For the enumeration of trees with edge labels having more than two possible values, however, the operation "Push{FTs: $n_m$}" may refer to the union of more than two such pushed sets (i.e., a union of pushed sets for each possible value for j). Block 3216 then merges the pushed sets {FTs: $n_m$} using the set merger operation as shown in relation (3). Block 3220 then determines {FTs: N} as an unordered combination of the trees enumerated for all allocations $A_i$ of N−1 nodes determined at block 3216. In this particular example, {FTs: N} is determined as the union of the sets {FTs: $A_i$} determined at blocks 3208 through 3218.

An example of enumerating a tree from a finite number of nodes and determining a natural numeral for these trees in connection with process 3200 is illustrated with reference to FIGS. 18 through 25 in which the number of nodes for each enumerated tree is N=4. In this particular example, the enumerated trees will be BELTs, defining, for this particular embodiment, the initial conditions to include k=2 and r=1 in the push operation of relation (2). However, this is merely an example of a tree that may have N nodes and the presently illustrated embodiment may be applied to the enumeration of differently labeled trees. For example, the presently illustrated example may be extended to non-BELT trees by selecting different values for "k" and "r" for the push operation of relation (2). However, a push operation other than that of relation (2) may be employed depending on the particular embodiment.

In an initial operation, {FTs: 4}=∅. In a base operation, {FTs: 1}={1}. A distribution list for {FTs: 4} provides possible allocations of N (here, four) nodes among up to N−1 (here, three) subtree slots is shown in Table 2 below (as determined at block 3206):

TABLE 2

Allocation of N-1 (Three) Nodes Among up to N-1 Subtree Slots

| Allocation Number | Subtree Slots | | |
|---|---|---|---|
|  | 0 | 1 | 2 |
| 0 | 3 | 0 | 0 |
| 1 | 2 | 1 | 0 |
| 2 | 1 | 1 | 1 |

In the allocations of three nodes among subtree slots of Table 2, an allocation may allocate to a subtree slot one, two or all three nodes. Thus, for any of these subtree slots, the process 3200 may enumerate sets of fully configured subtrees for these allocations of one, two or all three nodes to a subtree slot as {FTs: 1} (determined as {1} in the base operation), {FTs: 2} and {FTs: 3}, respectively. Block 3212 may recursively determine values for these sets. For {FTs: 3}, a distribution list setting forth possible allocations of three nodes among two subtree slots is shown in Table 3 below:

TABLE 3

Allocation of Two Nodes Among Two Subtree Slots

| Allocation Number | Subtree Slots | |
|---|---|---|
|  | 0 | 1 |
| 0 | 2 | 0 |
| 1 | 1 | 1 |

Figure 18:
FIG. 18 is a schematic diagram illustrating a distribution of one unique allocation of a single node depending from a root node.

For {FTs: 2}, there is one unique allocation of a single node depending from a root node in a single subtree slot and provides a subtree as shown in FIG. 18. The push operation is then applied to determine the elements of {FTs: 2} Since the possible subtree structures are BELTs (here, with k=1), {FTs: 2} is expressed as the union of a zero-push and one-push values as follows:

$$\{\langle j = 0, k = 1\rangle - \text{push}[\{1\}]\} \cup \{\langle j = 1, k = 1\rangle - \text{push}[\{1\}]\} =$$
$$\{\langle j = 0, k = 1\rangle - \text{push}(1)\} \cup \{\langle j = 1, k = 1\rangle - \text{push}(1)\} =$$
$$\{P(1) \cup P(2)\} = \{2, 3\}$$

Figure 19:
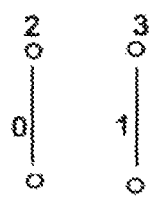
FIG. 19 is a schematic diagram illustrating BELTs that may be configured from two nodes.

These enumerated trees in {FTs: 2} are shown in FIG. 19. Since there is only one allocation of nodes to a single subtree slot for {FTs: 2}, there is no merger operation for determining the elements of {FTs: 2}.

Figure 20:
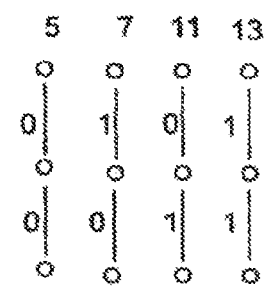
FIGS. 20 through 22 are schematic diagrams illustrating BELTs that may be configured from three nodes.

To determine the elements of {FTs: 3}, a first component of elements is determined from the allocation of two nodes to a single subtree slot (as shown in allocation 0 of Table 3) and a second component of elements is determined from the allocation of a single node to two subtree slots (as shown in allocation 0 of Table 3). Regarding the first component of {FTs: 3}, these two nodes allocated to a single subtree slot may be formed in four different binary edge labeled strings as illustrated in FIG. 20. These binary edge labeled strings are, in effect, either a zero-push or one-push of the trees enumerated in {FTs: 2}={2, 3}. As such, the set of values for these trees may be enumerated as follows:

$$\{<j=0,k=1>\text{-push}[\{2,3\}]\} \cup \{<j=1,k=1>\text{-push}[\{2,3\}]\}$$

$$\{<j=0,k=1>\text{-push}(2)\} \cup \{<j=1,k=1>\text{-push}(2)\} \cup \{<j=0,k=1>\text{-push}(3)\} \cup \{<j=1,k=1>\text{-push}(3)\}$$

$$=\{5,7,11,13\}$$

Figure 21:
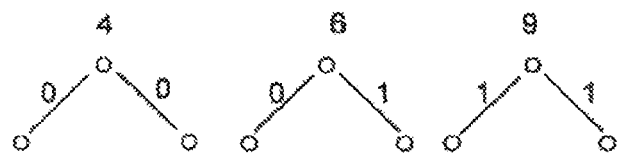

The second, remaining component of elements of {FTs: 3}, may be represented in three different BELTs as illustrated in FIG. 21. As such, the set of values for these trees may be enumerated by performing a set merger operation of {FT: 2} (as shown in FIG. 19) with itself as follows (block 3216):

$$\{FT:2\} \times \{FT:2\} = \{2,3\} \times \{2,3\} = \{2*2, 2*3, 3*3)\} = \{4,6,9\}$$

Figure 22:
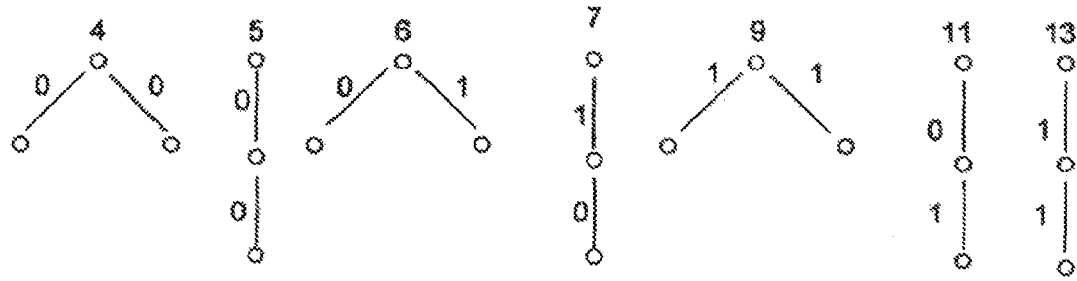
Figure 23:
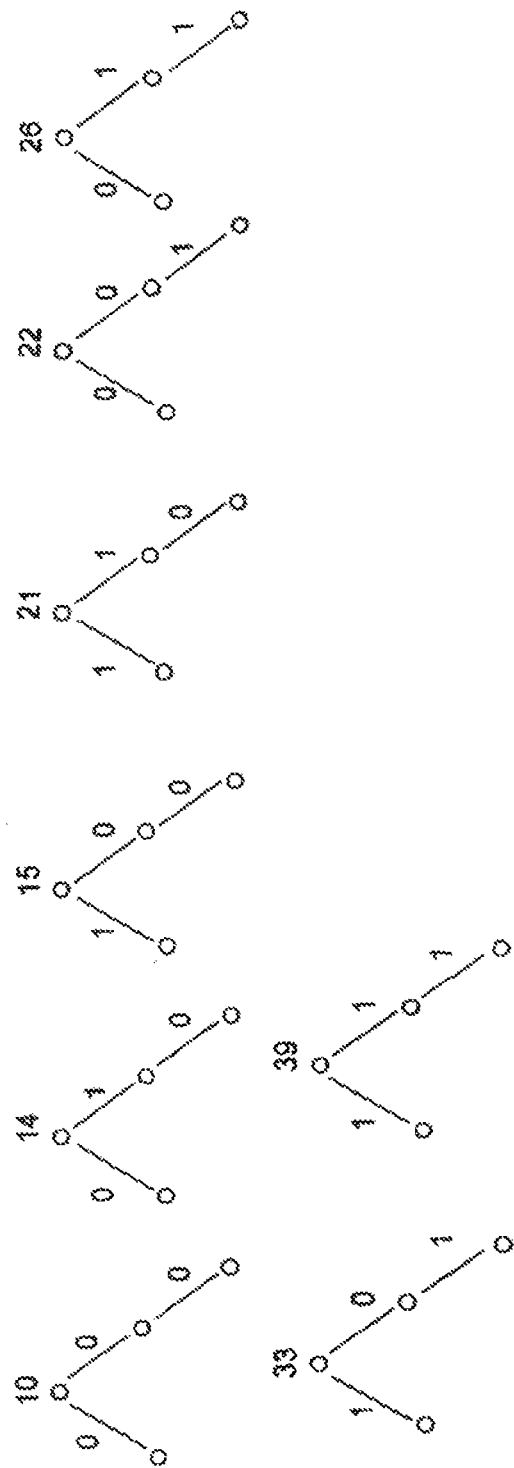
FIGS. 23 through 25 are schematic diagrams illustrating BELTs that may be configured from four nodes.
Figure 24:
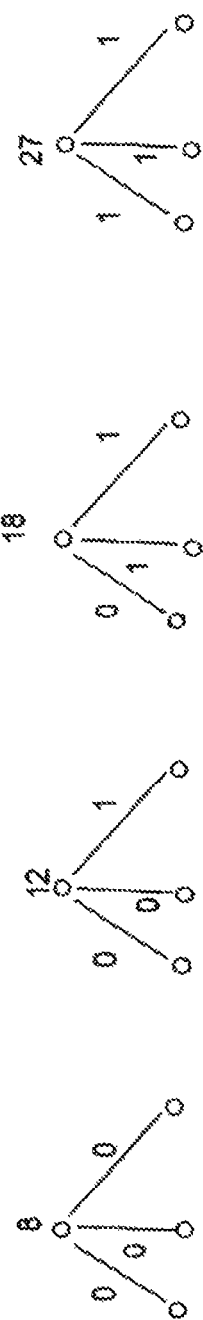
Figure 25:
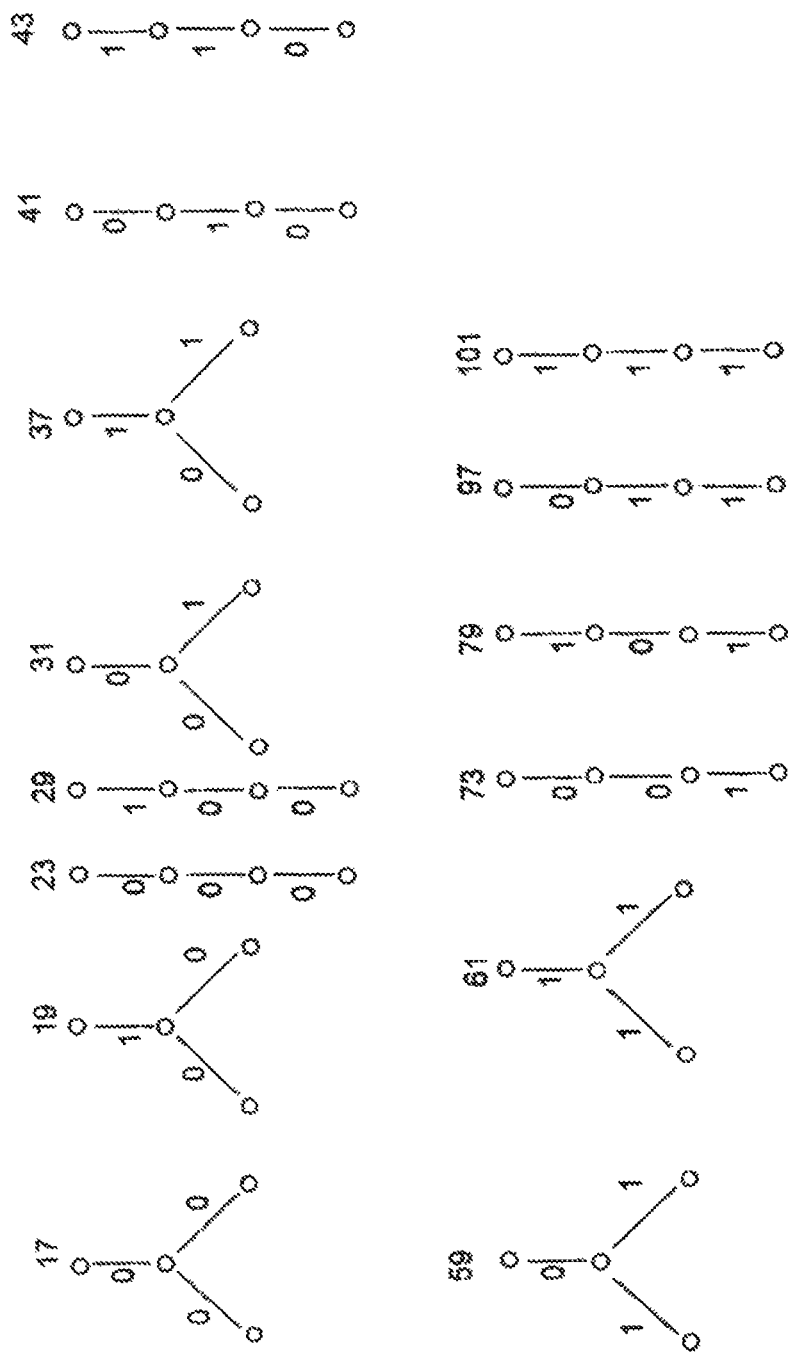

Accordingly, the union of the elements from first and second components of {FT: 3} (as derived above from the allocations 0 and 1 in Table 3) provides {FTs: 3}={4, 5, 6, 7, 9, 11, 13}. As shown in FIG. 22, each of these elements correspond with a unique subtree in {FTs: 3} and is associated with a corresponding natural numeral.

To determine the elements of {FTs: 4}, a first component of the elements is determined from the allocation of three nodes a single subtree slot (as shown in allocation 0 of Table 2), a second component of the elements is determined from the allocation of two nodes to a first subtree slot and one node to a second subtree slot (as shown in allocation 1 of Table 2) and a third component of the elements is determined from the allocation of a single node to three subtree slots (as shown in allocation 2 of Table 2). {FTs: 4} comprises the union of these three components.

The elements of the first component of {FTs: 4}, derived from the allocation of three nodes allocated to a single subtree slot, comprises, in effect, a union of a zero-push and one-push of {FTs: 3} (={4, 5, 6, 7, 9, 11, 13} as derived above and graphically illustrated in FIG. 22). These elements of the first component of {FTs: 4} are depicted graphically in FIG. 25 and are enumerated as follows:

$$\{\langle j=0, k=1 \rangle - \text{push}[\{FTs: 3\}]\} \cup \{\langle j=1, k=1 \rangle - \text{push}[\{FTs: 3\}]\} =$$

$$\{\langle j=0, k=1 \rangle - \text{push}[\{4, 5, 6, 7, 9, 11, 13\}]\} \cup$$

$$\{\langle j=1, k=1 \rangle - \text{push}[\{4, 5, 6, 7, 9, 11, 13\}]\} =$$

$$\{\langle j=0, k=1 \rangle - \text{push}(4)\} \cup \{\langle j=1, k=1 \rangle - \text{push}(4)\} \cup$$

$$\{\langle j=0, k=1 \rangle - \text{push}(5)\} \cup \{\langle j=1, k=1 \rangle - \text{push}(5)\} \cup$$

$$\{\langle j=0, k=1 \rangle - \text{push}(6)\} \cup \{\langle j=1, k=1 \rangle - \text{push}(6)\} \cup$$

$$\{\langle j=0, k=1 \rangle - \text{push}(7)\} \cup \{\langle j=1, k=1 \rangle - \text{push}(7)\} \cup$$

$$\{\langle j=0, k=1 \rangle - \text{push}(9)\} \cup \{\langle j=1, k=1 \rangle - \text{push}(9)\} \cup$$

$$\{\langle j=0, k=1 \rangle - \text{push}(11)\} \cup \{\langle j=1, k=1 \rangle - \text{push}(11)\} \cup$$

$$\{\langle j=0, k=1 \rangle - \text{push}(13)\} \cup \{\langle j=1, k=1 \rangle - \text{push}(13)\} =$$

$$\{17, 19, 23, 29, 31, 37, 41, 43, 59, 61, 73, 79, 97, 101\}.$$

The elements of the second component of {FTs: 4} are derived from the allocation of two nodes to a first subtree slot and a single node to a second subtree slot. These elements comprise, in effect, a set merger of {zero-push[{FTs: 2)}]∪one-push[{FTs: 2}]}(graphically illustrated in FIG. 20) and {zero-push[{FTs: 1)}]∪one-push[{FTs: 1}]}) (graphically illustrated in FIG. 19). The elements from the resulting set merger operation are graphically illustrated in FIG. 23 and the corresponding numbers representing the resulting elements are determined as follows (block 3216):

$$\{\langle j=0, k=1 \rangle - \text{push}[\{FTs: 2\}]\} \cup \langle j=1, k=1 \rangle - \text{push}[\{FTs: 2\}]\} \times$$

$$\{\langle j=0, k=1 \rangle - \text{push}[\{FTs: 1\}]\} \cup \langle j=1, k=1 \rangle - \text{push}[\{FTs: 1\}]\} =$$

$$\{\langle j=0, k=1 \rangle - \text{push}[\{2, 3\}]\} \cup \langle j=1, k=1 \rangle - \text{push}[\{2, 3\}]\} \times$$

$$\{\langle j=0, k=1 \rangle - \text{push}[\{1\}]\} \cup \langle j=1, k=1 \rangle - \text{push}[\{1\}]\} =$$

$$\{5, 7, 11, 13\} \times \{2, 3\} = \{10, 14, 15, 21, 22, 26, 33, 39\}$$

The elements of the third component of the elements of {FTs: 4} are derived from the allocation of a single node to each of three subtree slots. These elements are, in effect, a set merger operation of {zero-push[{FTs: 1}]∪one-push[{FTs: 1}]} (as graphically illustrated in FIG. 19) with itself twice. The elements from the resulting set merger operation are graphically illustrated in FIG. 24 and the corresponding numerals representing the elements are determined as follows (block 3216):

$$\{\langle j=0, k=1 \rangle - \text{push}[\{FTs: 1\}]\} \cup \langle j=1, k=1 \rangle - \text{push}[\{FTs: 1\}]\} \times$$

$$\{\langle j=0, k=1 \rangle - \text{push}[\{FTs: 1\}]\} \cup \langle j=1, k=1 \rangle - \text{push}[\{FTs: 1\}]\} \times$$

$$\{\langle j=0, k=1 \rangle - \text{push}[\{FTs: 1\}]\} \cup \langle j=1, k=1 \rangle - \text{push}[\{FTs: 1\}]\} =$$

$$\{2, 3\} \times [\{2, 3\} \times \{2, 3\}] = \{2, 3\} \times \{4, 6, 9\} = \{8, 12, 18, 27\}$$

The union of the first, second and third components of the elements of {FTs: 4}, separately derived from allocations 0, 1 and 3 of three nodes among subtree slots (block 3220), is provided as follows:

$$\{FTs:4\} = \{17,19,23,29,31,37,41,43,59,61,73,79,97, 101\} \cup \{10,14,15,21,22,26,33,39\} \cup \{8,12,18,27\}$$

$$= \{8,10,12,14,15,17,18,19,21,22,23,26,27,29,31,33,37, 39,41,43,59,61,73,79,97,101\}.$$

While the above illustrated example is a specific case of enumerating BELTs from four nodes, it should be understood that the process 3200 is general enough to enumerate trees for any finite number of nodes N. Also, while the illustrated example is specifically directed to enumerating BELTs, the claimed subject matter is not limited to this specific example.

According to an embodiment, the technique described above may have many applications in the management and/or manipulation of hierarchical data. The ability to enumerate possible fully configured trees from a finite number of nodes may be applied to any one of several database management applications. In one example, with a priori knowledge of a size and type of tree representing hierarchical data in a cache memory, for example, a cache process may anticipate the extent of requests for retrieval of hierarchical data represented by a tree.

In another application, pattern matching may be used as a form of answering queries. Using the above described technique for enumerating possible trees from a finite number of nodes, possible tree patterns may be efficiently generated in advance of receipt of a query to be matched with one of the generated tree patterns. Here, for example, a set of enumerated trees may be generated prior to a query to anticipate all potential hierarchical relationships for a given set of data. The query may then be mapped and matched with all possible tree structures with a given number of nodes. By anticipating all potential hierarchical relationships in advance of the query, the query may be answered more quickly. Of course, these are merely examples and the claimed subject matter is not limited to these examples.

It will, of course, be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although the claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with the claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive, although, again, the claimed subject matter is not limited in scope to this example.

In the preceding description, various aspects of the claimed subject matter have been described. For purposes of explanation, specific numbers, systems and/or configurations were set forth to provide a thorough understanding of the claimed subject matter. However, it should be apparent to one skilled in the art having the benefit of this disclosure that the claimed subject matter may be practiced without the specific details. In other instances, well-known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of the claimed subject matter.

The invention claimed is:

1. A method of enumerating complex two-dimensional graphical hierarchies for more convenient processing and/or storage, a complex two-dimensional graphical hierarchy being in the form of a tree hierarchy, the method comprising:
    accessing instructions from one or more physical memory devices for execution by one or more processors;
    executing instructions accessed from the one or more physical memory devices by the one or more processors;
    storing, in at least one of the physical memory devices, signal values resulting from having executed the instructions on the one or more processors;
    wherein the accessed instructions to enumerate tree hierarchies; and
    wherein executing the accessed tree hierarchy enumeration instructions further comprising:
        enumerating tree hierarchies, in which a tree hierarchy comprises one or more signal values, configured from a finite number (N) of nodes, wherein N comprises a natural numeral greater than one, the enumerating of tree hierarchies configured from the finite number of nodes further comprising;
            identifying N−1 arrangements of subtree hierarchy slots coupled to a root node;
            for an arrangement of subtree hierarchy slots:
                determining one or more allocations of N−1 nodes among the subtree hierarchy slots in the arrangement, a subtree hierarchy slot being allocated a portion of the N−1 nodes; and
                for the subtree hierarchy slots, enumerating one or more subtree hierarchies configured from the portion of the N−1 nodes allocated to the subtree hierarchy slot;
            determining for the enumerated tree hierarchies natural numerals associated with particular ones of the enumerated tree hierarchies; and
            storing, in a memory, the natural numerals.

2. The method of claim 1, wherein the executing the accessed tree hierarchy enumeration instructions further comprises:
    associating the enumerated one or more subtree hierarchies for a subtree hierarchy slot with a natural numeral; and
    determining the natural numeral associated with a tree hierarchy enumerated from an allocation of the N−1 nodes among subtree hierarchies based, at least in part, upon a combination of the natural numerals associated with particular subtree hierarchies enumerated from the allocation of N−1 nodes.

3. The method of claim 2, wherein the natural numeral associated with a tree hierarchy enumerated from an allocation of the N−1 nodes is based, at least in part, upon a product of the natural numerals associated with the particular subtree hierarchies enumerated from the allocation of N−1 nodes.

4. The method of claim 1, wherein the executing the accessed tree hierarchy enumeration instructions further comprises:
    identifying each enumerated tree hierarchy as being a composite of subtree hierarchies according to one of the N−1 arrangements of subtree hierarchy slots, N−1 nodes being allocated among the composite of subtree hierarchies, each subtree hierarchy in the composite of subtree hierarchies having a particular configuration of nodes which are allocated to the subtree hierarchy and being associated with a natural numeral based, at least in part, upon the association among the allocated nodes, and wherein the natural numeral associated with the tree hierarchy comprises a combination of the natural numerals associated with the subtree hierarchies in the composite of subtree hierarchies.

5. The method of claim 1, wherein the executing the accessed tree hierarchy enumeration instructions further comprises:
    identifying an enumerated tree as being a composite of subtree hierarchies according to one of the N−1 arrangement of subtree hierarchy slots, N−1 nodes being allocated among the composite of subtree hierarchies, a subtree hierarchy in the composite of subtree hierarchies having a particular configuration of nodes which are allocated to the subtree hierarchy and being associated with a natural numeral, and wherein the natural numeral associated with the tree hierarchy comprises a combination of the natural numerals associated with the subtree hierarchies in the composite of subtree hierarchies.

6. The method of claim 1, wherein:
identifying N−1 arrangements of subtree hierarchy slots, comprises identifying each of N−1 arrangements of subtree hierarchy slots coupled to the root node;
determining one or more allocations of N−1 nodes comprises determining the one or more allocations of N−1 nodes among the subtree hierarchy slots in the arrangement, each subtree hierarchy slot being allocated a portion of the N−1 nodes; and
enumerating one or more subtree hierarchies configured from the portion of the N−1 nodes allocated to the subtree hierarchy slot comprises enumerating each of one or more subtree hierarchies configured from the portion of the N−1 nodes allocated to the subtree hierarchy slot.

7. The method of claim 6, wherein the executing the accessed tree hierarchy enumeration instructions further comprises:
associating each of the enumerated one or more subtree hierarchies for each subtree hierarchy slot with a natural numeral; and
determining the natural numeral associated with each tree hierarchy enumerated from an allocation of the N−1 nodes, among subtree hierarchies based, at least in part, upon a combination of the natural numerals associated with particular subtree hierarchies enumerated from the allocation of N−1 nodes.

8. The method of claim 7, wherein the natural numeral associated with each tree hierarchy enumerated from an allocation of the N−1 nodes is based, at least in part, upon a product of the natural numerals associated with the particular subtree hierarchies enumerated from the allocation of N−1 nodes.

9. The method of claim 1, wherein the executing the accessed tree hierarchy enumeration instructions further comprises enumerating the tree hierarchies configured from exactly N nodes.

10. An apparatus to enumerate a complex two-dimensional graphical hierarchy for more convenient processing and/or storage, a complex two-dimensional graphical hierarchy being in the form of a tree hierarchy, the apparatus comprising:
means for accessing instructions from one or more physical memory devices for execution by one or more processors;
means for executing instructions accessed from the one or more physical memory devices by the one or more processors;
means for storing, in at least one of the physical memory devices, signal values resulting from having executed the instructions on the one or more processors;
wherein the accessed instructions to enumerate tree hierarchies; and
wherein the means for executing the accessed tree hierarchy enumeration instructions comprises:
means for enumerating tree hierarchies, a tree hierarchy to comprise one or more signal values, configured from a finite number (N) of nodes, wherein N comprises a natural numeral greater than one; the means for enumerating tree hierarchies configured from the finite number of nodes further comprises:
means for identifying N−1 arrangements of subtree hierarchy slots coupled to a root node;
means for determining one or more allocations of N−1 nodes among the subtree hierarchy slots in an identified arrangement of subtree hierarchy slots, a subtree hierarchy slot being allocated a portion of the N−1 nodes; and
means for enumerating one or more subtree hierarchies, configured from the portion of the N−1 nodes allocated to the subtree hierarchy slot;
means for determining, for the enumerated tree hierarchies, natural numerals associated with particular ones of the enumerated tree hierarchies; and
means for storing, in a memory, the natural numerals.

11. The apparatus of claim 10, wherein the means for executing the accessed tree hierarchy enumeration instructions further comprises:
means for associating the enumerated one or more subtree hierarchies for a subtree hierarchy slot with a natural numeral; and
means for determining the natural numeral associated with a tree hierarchy enumerated from an allocation of the N−1 nodes among subtree hierarchies based, at least in part, upon a combination of the natural numerals, associated with particular subtree hierarchies enumerated from the allocation of N−1 nodes.

12. The apparatus of claim 11, wherein the natural numeral associated with a tree hierarchy enumerated from an allocation of the N−1 nodes is based, at least in part, upon a product of the natural numerals associated with the particular subtree hierarchies enumerated from the allocation of N−1 nodes.

13. The apparatus of claim 10, wherein the means for executing the accessed tree hierarchy enumeration instructions further comprises:
means for identifying each enumerated tree hierarchy, represented by one or more signal values, as being a composite of subtree hierarchies according to one of the N−1 arrangement of subtree hierarchy slots, N−1 nodes being allocated among the composite of subtree hierarchies, each subtree hierarchy, in the composite of subtree hierarchies, having a particular configuration of nodes which are allocated to the subtree hierarchy and being associated with a natural numeral based, at least in part, upon the association among the allocated nodes, and wherein the natural numeral associated with the tree hierarchy comprises a combination of the natural numerals associated with the subtree hierarchies in the composite of subtree hierarchies.

14. The apparatus of claim 10, wherein the means for executing the accessed tree hierarchy enumeration instructions further comprises:
means for identifying an enumerated tree hierarchy as being a composite of subtree hierarchies according to one of the N−1 arrangement of subtree hierarchy slots, N−1 nodes being allocated among the composite of subtree hierarchies, a subtree hierarchy in the composite of subtree hierarchies having a particular configuration of nodes which are allocated to the subtree hierarchy and being associated with a natural numeral, and wherein the natural numeral associated with the tree hierarchy comprises a combination of the natural numerals associated with the subtree hierarchies in the composite of subtree hierarchies.

15. The apparatus of claim 10, wherein:
the means for identifying N−1 arrangements of subtree hierarchy slots comprises means for identifying each of N−1 arrangements of subtree hierarchy slots coupled to the root node;

the means for determining one or more allocations of N−1 nodes comprises means for determining one or more allocations of N−1 nodes among the subtree hierarchy slots in the arrangement, each subtree hierarchy slot being allocated a portion of the N−1 nodes; and the means for enumerating one or more subtree hierarchies, configured from the portion of the N−1 nodes allocated to the subtree hierarchy slot comprises means for enumerating each of one or more subtree hierarchies configured from the portion of the N−1 nodes allocated to the subtree hierarchy slot.

16. The apparatus of claim 15, wherein the means for executing the accessed tree hierarchy enumeration instructions further comprises:

means for associating each of the enumerated one or more subtree hierarchies for each subtree hierarchy slot with a natural numeral; and means for determining the natural numeral associated with each tree hierarchy enumerated from an allocation of the N−1 nodes among subtree hierarchies based, at least in part, upon a combination of the natural numerals associated with particular subtree hierarchies enumerated from the allocation of N−1 nodes.

17. The apparatus of claim 16, wherein the natural numeral associated with each tree enumerated from an allocation of the N−1 nodes is based, at least in part, upon a product of the natural numerals associated with the particular subtree hierarchies enumerated from the allocation of N−1 nodes.

18. The apparatus of claim 10, wherein the means for enumerating configured tree hierarchies comprises means for enumerating the tree hierarchies configured from exactly N nodes.

19. An apparatus comprising:

one or more processors coupled to one or more physical memory devices to store executable instructions and to store binary digital signal quantities as physical memory states, wherein the executable instructions being:

accessible from the physical memory devices for execution by one or more processors;

executable by the one or more processors; and able to store in at least one of the physical memory devices, binary digital signal quantities, if any, that are to result from execution of the instructions on the one or more processors, wherein the accessed executable instructions to enumerate tree hierarchies; and wherein the accessed tree hierarchy enumeration instructions further:

to enumerate tree hierarchies, a tree hierarchy to comprise one or more signal values, configured from a finite number (N) of nodes, wherein N comprises a natural numeral greater than one, wherein to enumerate tree hierarchies configured from the finite number of nodes further comprises to;

identify N−1 arrangements of subtree hierarchy slots to be coupled to a root node;

determine one or more allocations of N−1 nodes among the subtree hierarchy slots in a to be identified arrangement of subtree hierarchy slots, a subtree hierarchy slot to be allocated a portion of the N−1 nodes; and enumerate one or more subtree hierarchies configured from the portion of the N−1 nodes to be allocated to the subtree hierarchy slot;

to determine for the to be enumerated tree hierarchies natural numerals to be associated with particular ones of the to be enumerated tree hierarchies; and to store, in a memory, the natural numerals.

20. The apparatus of claim 19, wherein the accessed tree hierarchy instructions further to:

associate the to be enumerated one or more subtree hierarchies for a subtree hierarchy slot with a natural numeral; and determine the natural numeral to be associated with a tree hierarchy to be enumerated from an allocation of the N−1 nodes among subtree hierarchies to be based, at least in part, upon a combination of the natural numerals to be associated with particular subtree hierarchies to be enumerated from the allocation of N−1 nodes.

21. The apparatus of claim 20, wherein the natural numeral to be associated with a tree hierarchy to be enumerated from an allocation of the N−1 nodes is to be based, at least in part, upon a product of the natural numerals to be associated with the particular subtree hierarchies to be enumerated from the allocation of N−1 nodes.

22. The apparatus of claim 19, wherein the accessed tree hierarchy instructions further to:

identify each enumerated tree hierarchy as being a composite of subtree hierarchies to be according to one of the N−1 arrangement of subtree hierarchy slots, N−1 nodes to be allocated among the composite of subtree hierarchies, each subtree hierarchy in the composite of subtree hierarchies to have a particular configuration of nodes which are to be allocated to the subtree hierarchy and to be associated with a natural numeral to be based, at least in part, upon the association among the allocated nodes, and wherein the natural numeral to be associated with the tree hierarchy to comprise a combination of the natural numerals to be associated with the subtree hierarchies in the composite of subtree hierarchies.

23. The apparatus of claim 19, wherein the accessed tree hierarchy instructions further to:

identify an enumerated tree hierarchy as being a composite of subtree hierarchies to be according to one of the N−1 arrangement of subtree hierarchy slots, N−1 nodes to be allocated among the composite of subtree hierarchies, a subtree hierarchy in the composite of subtree hierarchies to have a particular configuration of nodes which are to be allocated to the subtree hierarchy and to be associated with a natural numeral, and wherein the natural numeral associated with the tree hierarchy to comprise a combination of the natural numerals to be associated with the subtree hierarchies in the composite of subtree hierarchies.

24. The apparatus of claim 19, wherein the accessed tree hierarchy instructions further to:

identify each of N−1 arrangements of subtree hierarchy slots to be coupled to the root node;

determine one or more allocations of N−1 nodes to be among the subtree hierarchy slots in the arrangement, each subtree hierarchy slot to be allocated a portion of the N−1 nodes; and enumerate one or more subtree hierarchies configured from the portion of the N−1 nodes to be allocated to the subtree hierarchy slot to comprise an enumeration of each of one or more subtree hierarchies configured from the portion of the N−1 nodes to be allocated to the subtree hierarchy slot.

25. The apparatus of claim 24, wherein the accessed tree hierarchy instructions further to:

associate each of the to be enumerated one or more subtree hierarchies for each subtree hierarchy slot with a natural numeral; and determine the natural numeral to be associated with each tree hierarchy to be enumerated from an allocation of the N−1 nodes among subtree hierarchies to be based, at least in part, upon a combination of the natural numerals to be associated with particular subtree hierarchies to be enumerated from the allocation of N−1 nodes.

26. The apparatus of claim 25, wherein the natural numeral to be associated with each tree hierarchy to be enumerated from an allocation of the N−1 nodes is to be based, at least in part, upon a product of the natural numerals to be associated with the particular subtree hierarchies to be enumerated from the allocation of N−1 nodes.

27. The apparatus of claim 19, wherein the accessed tree hierarchy instructions further to enumerate the tree hierarchies configured from exactly N nodes.

28. An article comprising:
a non-transitory storage medium comprising instructions stored thereon,
wherein the instructions being accessible from the non-transitory storage medium to store as physical memory states on one or more physical memory devices, the one or more physical memory devices coupled to one or more processors able to execute the instructions stored as physical memory states, the one or more physical memory devices also able to store binary digital signal quantities, if any, as physical memory states, that are to result from execution of the instructions on the one or more processors,
wherein the executable instructions to enumerate tree hierarchies; and
wherein tree hierarchy enumeration instructions further:
to enumerate tree hierarchies, a tree hierarchy to comprise one or more signal values, configured from a finite number (N) of nodes, wherein N comprises a natural numeral greater than one, wherein to enumerate tree hierarchies configured from the finite number of nodes further to;
identify N−1 arrangements of subtree hierarchy slots to be coupled to a root node;
determine one or more allocations of N−1 nodes among the subtree hierarchy slots in a to be identified arrangement of subtree hierarchy slots, a subtree hierarchy slot to be being allocated a portion of the N−1 nodes; and
enumerate one or more subtree hierarchies configured from the portion of the N−1 nodes to be allocated to the subtree hierarchy slot;
to determine for the to be enumerated tree hierarchies natural numerals to be associated with particular ones of the to be enumerated tree hierarchies; and
to store, in a memory, the natural numerals.

29. The article of claim 28, the instructions being further executable by the one or more processors to:
associate the to be enumerated one or more subtree hierarchies for subtree hierarchy slot with a natural numeral; and
determine the natural numeral to be associated with a tree hierarchy to be enumerated from an allocation of the N−1 nodes among subtree hierarchies to be based, at least in part, upon a combination of the natural numerals to be associated with particular subtree hierarchies to be enumerated from the allocation of N−1 nodes.

30. The article of claim 29, wherein the natural numeral to be associated with a tree hierarchy to be enumerated from an allocation of the N−1 nodes is to be based, at least in part, upon a product of the natural numerals to be associated with the particular subtree hierarchies to be enumerated from the allocation of N−1 nodes.

31. The article of claim 28, the instructions being further executable by the one or more processors to:
identify each enumerated tree hierarchy as being a composite of subtree hierarchies to be according to one of the N−1 arrangement of subtree hierarchy slots, N−1 nodes to be allocated among the composite of subtree hierarchies, each subtree hierarchy in the composite of subtree hierarchies have a particular configuration of nodes which are to be allocated to the subtree hierarchy and to be associated with a natural numeral based, at least in part, upon said association among the allocated nodes, and wherein the natural numeral to be associated with the tree hierarchy to comprise a combination of the natural numerals to be associated with the subtree hierarchies in the composite of subtree hierarchies.

32. The article of claim 28, the instructions being further executable by the one or more processors to:
identify an enumerated tree hierarchy as being a composite of subtree hierarchies to be according to one of the N−1 arrangement of subtree hierarchy slots, N−1 nodes to be allocated among the composite of subtree hierarchies, a subtree hierarchy in the composite of subtree hierarchies to be a particular configuration of nodes which are to be allocated to the subtree hierarchy and to be associated with a natural numeral, and wherein the natural numeral to be associated with the tree hierarchy to comprise a combination of the natural numerals to be associated with the subtree hierarchies in the composite of subtree hierarchies.

33. The article of claim 28, the instructions being further executable by the one or more processors to:
identify each of N−1 arrangements of subtree hierarchy slots to be coupled to the root node;
determine one or more allocations of N−1 nodes to be among the subtree hierarchy slots in the arrangement, each subtree hierarchy slot to be allocated a portion of the N−1 nodes; and
enumerate one or more subtree hierarchies configured from the portion of the N−1 nodes to be allocated to the subtree hierarchy slot to comprise an enumeration of each of one or more subtree hierarchies configured from the portion of the N−1 nodes to be allocated to the subtree hierarchy slot.

34. The article of claim 33, the instructions being further executable by the one or more processors to:
associate each of the to be enumerated one or more subtree hierarchies for each subtree hierarchy slot with a natural numeral; and
determine the natural numeral to be associated with each tree hierarchy to be enumerated from an allocation of the N−1 nodes among subtree hierarchies to be based, at least in part, upon a combination of the natural numerals to be associated with particular subtree hierarchies to be enumerated from the allocation of N−1 nodes.

35. The article of claim 34, wherein the natural numeral to be associated with each tree hierarchy to be enumerated from an allocation of the N−1 nodes is to be based, at least in part, upon a product of the natural numerals to be associated with the particular subtree hierarchies to be enumerated from the allocation of N−1 nodes.

36. The article of claim 28, the instructions being further executable by the one or more processors to enumerate the tree hierarchies configured from exactly N nodes.

\* \* \* \* \*

UNITED STATES PATENT AND TRADEMARK OFFICE
CERTIFICATE OF CORRECTION

| | | |
|---|---|---|
| PATENT NO. | : 9,842,130 B2 | Page 1 of 1 |
| APPLICATION NO. | : 15/214168 | |
| DATED | : December 12, 2017 | |
| INVENTOR(S) | : Karl Schiffmann et al. | |

It is certified that error appears in the above-identified patent and that said Letters Patent is hereby corrected as shown below:

In the Claims

In Claim 1:
Column 18, Line 06, delete ";" after 'comprising' and insert --:--
Column 18, Line 09, delete ";" after 'slots' and insert --,--

In Claim 19:
Column 21, Line 44, delete "executable by the one or more processors;"
Column 21, Line 45, insert --the one or more processors-- before 'able to store'

Signed and Sealed this
Tenth Day of August, 2021

Drew Hirshfeld
*Performing the Functions and Duties of the
Under Secretary of Commerce for Intellectual Property and
Director of the United States Patent and Trademark Office*